Dec. 23, 1969    O. T. FERRARI    3,485,220
ROTARY INTERNAL COMBUSTION ENGINE
Filed Aug. 17, 1966    28 Sheets-Sheet 1

Dec. 23, 1969   O. T. FERRARI   3,485,220
ROTARY INTERNAL COMBUSTION ENGINE
Filed Aug. 17, 1966   28 Sheets-Sheet 4

Dec. 23, 1969　　　O. T. FERRARI　　　3,485,220
ROTARY INTERNAL COMBUSTION ENGINE
Filed Aug. 17, 1966　　　28 Sheets-Sheet 7

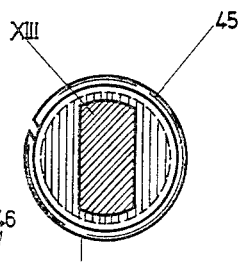
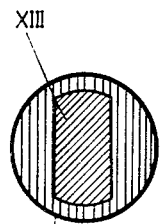
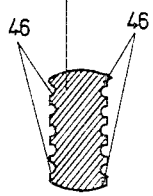
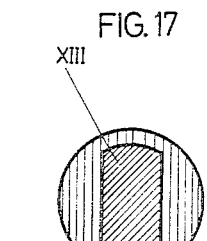
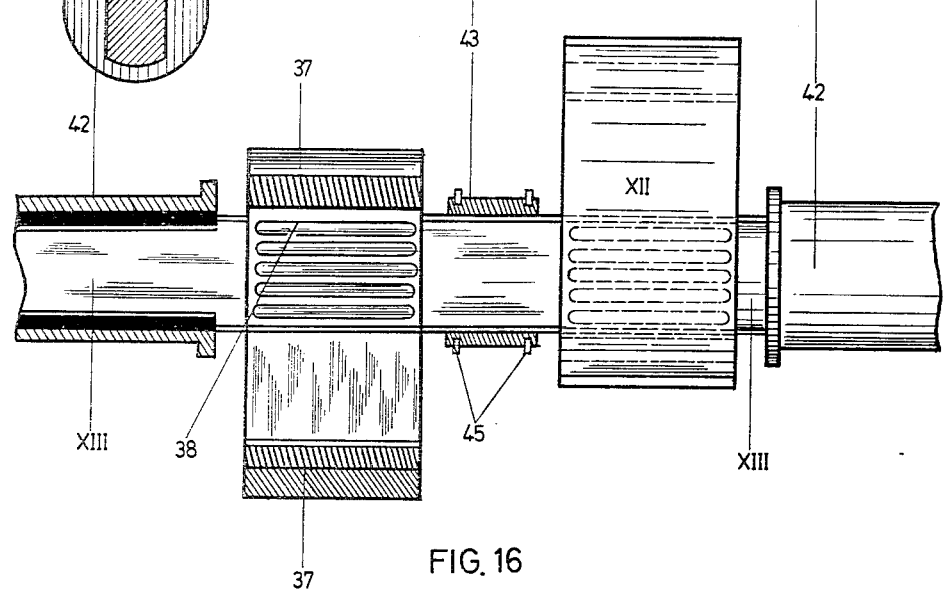

Dec. 23, 1969     O. T. FERRARI     3,485,220
ROTARY INTERNAL COMBUSTION ENGINE
Filed Aug. 17, 1966     28 Sheets-Sheet 11

Dec. 23, 1969  O. T. FERRARI  3,485,220
ROTARY INTERNAL COMBUSTION ENGINE
Filed Aug. 17, 1966  28 Sheets-Sheet 13

Dec. 23, 1969   O. T. FERRARI   3,485,220
ROTARY INTERNAL COMBUSTION ENGINE
Filed Aug. 17, 1966   28 Sheets-Sheet 14

Dec. 23, 1969   O. T. FERRARI   3,485,220
ROTARY INTERNAL COMBUSTION ENGINE
Filed Aug. 17, 1966   28 Sheets-Sheet 15

Dec. 23, 1969  O. T. FERRARI  3,485,220

ROTARY INTERNAL COMBUSTION ENGINE

Filed Aug. 17, 1966  28 Sheets-Sheet 19

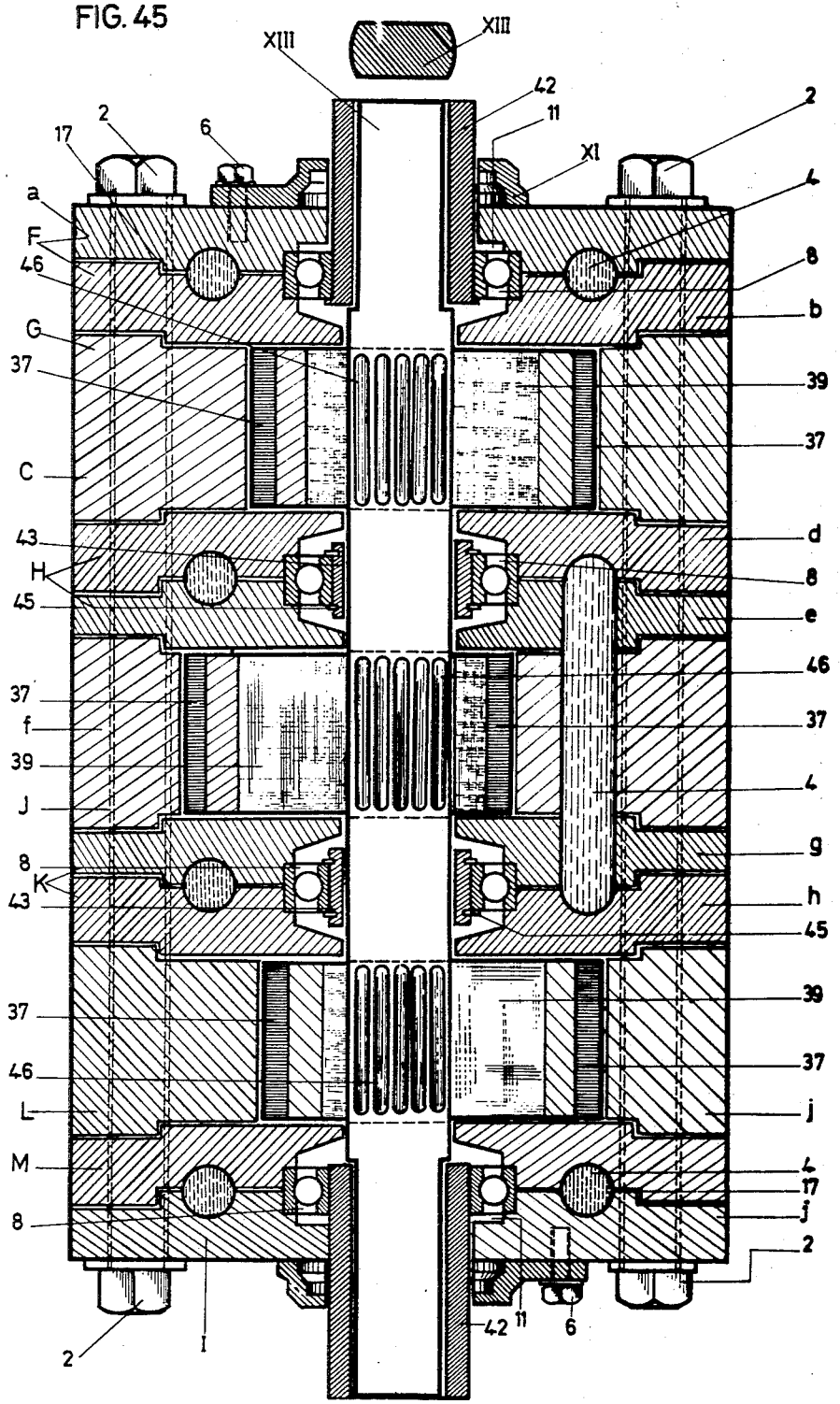

Dec. 23, 1969  O. T. FERRARI  3,485,220
ROTARY INTERNAL COMBUSTION ENGINE
Filed Aug. 17, 1966  28 Sheets-Sheet 21

Dec. 23, 1969   O. T. FERRARI   3,485,220
ROTARY INTERNAL COMBUSTION ENGINE
Filed Aug. 17, 1966   28 Sheets-Sheet 22

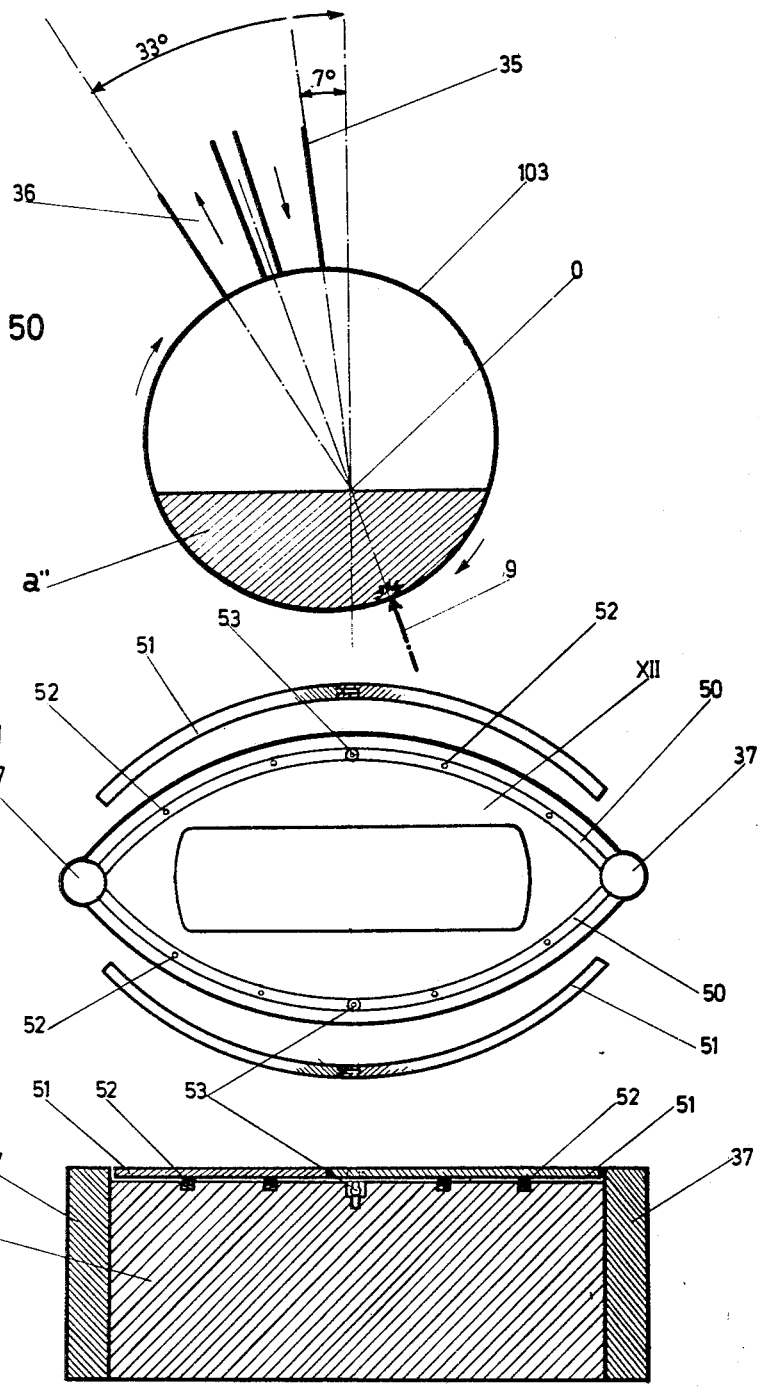

Dec. 23, 1969    O. T. FERRARI    3,485,220
ROTARY INTERNAL COMBUSTION ENGINE
Filed Aug. 17, 1966    28 Sheets-Sheet 26

Dec. 23, 1969   O. T. FERRARI   3,485,220
ROTARY INTERNAL COMBUSTION ENGINE
Filed Aug. 17, 1966   28 Sheets-Sheet 27
FIG. 55
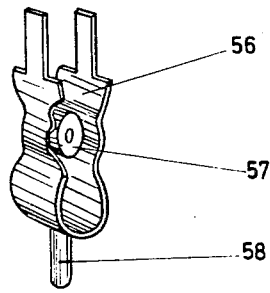
FIG. 56.
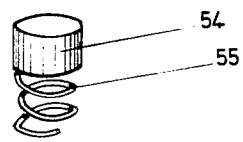
FIG. 57A
FIG. 57B
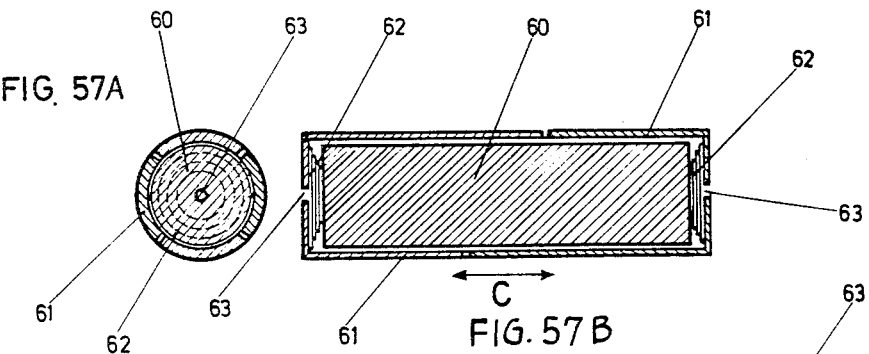
FIG. 58
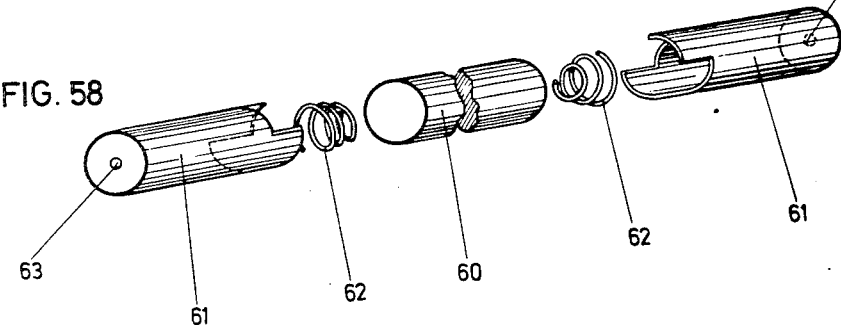

Dec. 23, 1969   O. T. FERRARI   3,485,220
ROTARY INTERNAL COMBUSTION ENGINE
Filed Aug. 17, 1966   28 Sheets-Sheet 28
FIG. 59
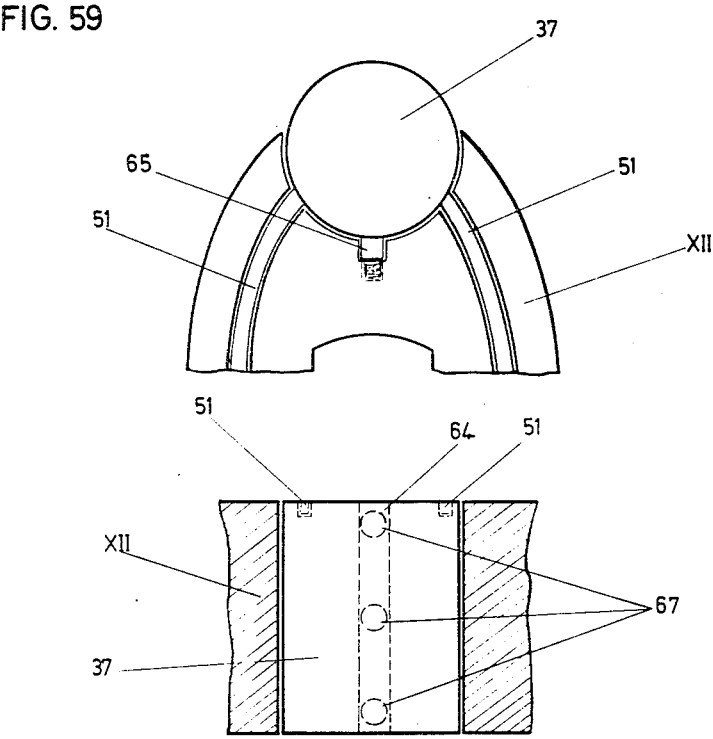
FIG. 60
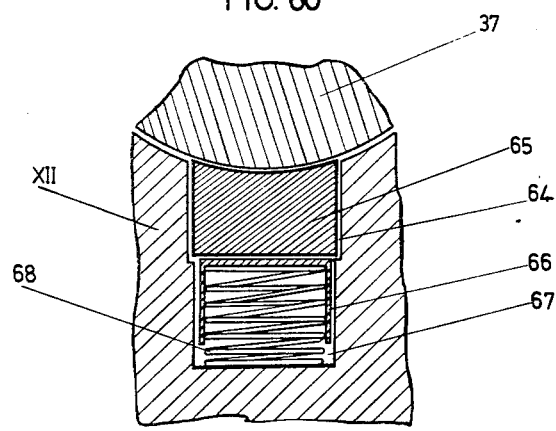
FIG. 61

United States Patent Office 3,485,220
Patented Dec. 23, 1969

3,485,220
ROTARY INTERNAL COMBUSTION ENGINE
Omar T. Ferrari, 101 San Martin, Colon,
Entre, Rios, Argentina
Filed Aug. 17, 1966, Ser. No. 577,568
Claims priority, application Spain, May 11, 1966,
326,586
Int. Cl. F02b 53/10; F01c 19/02
U.S. Cl. 123—8                                                  6 Claims

ABSTRACT OF THE DISCLOSURE

An expansible chamber device having a rotary piston arrangement in which the chamber for the piston has a portion of its arcuate wall formed of an arc of less than 180°, the remainder of the arcuate wall being non-cylindrical in outline.

This invention relates to a rotary internal combustion engine in which the rotation of the rotors is transmitted directly to the engine shaft which extends through the rotors.

In the motor according to this invention the block has in it a number of bearing boxes for the engine shaft and a number of boxes for rotor operation.

Each bearing box is formed by two discs formed internally with a recess or cavity receiving an anti-friction bearing. Each bearing box also has an internal annular passage for a cooling liquid, such passage communicating via intercommunicating passages with the other rotor and bearing boxes; the two discs at the ends of the engine have a provision for an external connection for the cooling liquid. In the bearing boxes there are two seals at the junction of the discs—one to separate the box from the bearing and the other for the intercommunicating passages and the fixing bolts. The discs of a pair are formed with co-operating annular shoulders so that when the discs are brought together they are connected to one another without lateral movement. At the centre of each bearing box and in axial extension of the recesses which receive the anti-friction bearings is a cylindrical opening which interconnects the rotor chambers and through which the engine shaft extends. Each rotor chamber is formed in a disc of appropriate thickness which is eccentrically chambered to receive a rotor, there being disposed on each side of such disc another disc forming part of a bearing box and a side closure for a rotor box.

Each rotor-receiving chamber has a cross-section such that the chord which interconnects any two points on the periphery of such chamber and which passes through the engine shaft axis is constant in length. This condition is arrived at, in accordance with the invention, by means of a closed curve including a circular arc of no more than 180° in extent. The axis of the engine shaft is disposed on the chord of such an arc and such chord is the chord of constant length. Clearly, therefore, the circular arc always takes up less than 50% of chamber cross-section. To facilitate engagement between the three discs which form a rotor box, the side closures and the chambered disc are formed with co-operating annular shoulders. Gaskets are provided between interfitting flat surfaces while the end walls of the chambers are smooth for continuous contact with the rotors.

The various discs are formed with rings of apertures disposed in equidistant relationship to one another and to the circular perimeter of the discs. A stud screw-threaded at both ends extends through each such aperture and is secured by nuts at each end of the engine block. The engine block is assembled with the discs in line, so as to form a completely cylindrical shape. With the engine block assembled, the chords of the circular parts of the chambers are offset from one another by an angle equal to 360° divided by the number of rotors.

There are two kinds of rotor box. One kind is for transmitting motive power to the engine shaft while the other kind serves as a pump for delivering a quantity of explosive mixture via an interconnecting passage to the inlet of the power transmitting rotor box. Alternatively, all the rotor boxes may be used to transmit motive power to the engine shaft in which case no interconnecting passage is used.

The central chamber-defining disc of a rotor box serving as a pump is provided with an inlet port, disposed in the top part of the engine, and an exhaust port disposed at 180° from the inlet port. In a particular arrangement of two rotor boxes, one serving as a pump and the other serving to transmit motive power to the engine shaft, the inlet port of the latter rotor box is disposed therein at an angle from the exhaust port of the former rotor box. The inlet port of the latter rotor box is disposed on one side of the engine block. The later rotor box is also provided at approximately 168° from the inlet port, with a tapped opening which receives a spark plug. At approximately 168° from the spark plug, an exhaust port is also provided.

Consequently, and through the agency of the various ports mentioned, the engine shaft, as it turns, produces an operating cycle, which can be considered as starting at the inlet port of the rotor box serving as a pump where the explosive mixture is received. After the rotor of such box has rotated through a semicircle, the mixture is exhausted through the exhaust port and passes through an outside connection to the inlet port of the rotor box serving to transmit motive power to the engine shaft, into which box the mixture is drawn by the rotor, compressed and then fired at 168° from its entry whereafter the burnt gases are scavenged by the rotor and pass through the exhaust port to atmosphere thus completing the cycle.

Now that the operation of the engine has been described, a description will be given of how it is cooled.

Cooling liquid enters through an opening at the bottom of the end disc of an end bearing box and passes through the annular cooling passage thereof, communicating via a number of interconnected passages with a power transmitting rotor box which in turn communicates via the same number of passages with the next bearing box, and the latter communicates with the passages of the next power transmitting rotor box which has the same number of passages via which the cooling liquid flows to the final bearing box and into another annular cooling passage. The liquid leaves the final bearing box through an opening at the top of its end disc, thus completing the cooling cycle.

The engine shaft may be sleeved where it is journalled in the bearings in the engine block, the shaft having two equal plane sides and two equal convex sides, the plane sides being greater in width.

The sleeves are disposed in encircling engagement with the central shaft and are internally shaped to be a close enough fit to obviate lateral and lengthwise displacement between the shaft and the sleeves. The sleeves are so positioned as to leave free sections of the shaft, which sections carry the rotors. Where the shaft extends through a rotor the cross-sectional shape of the shaft is similar to the remaining portions except that recesses are provided in the plane sides to receive bearing elements in the form of rollers or balls. Externally, each rotor has two plane sides and two curved sides. Opening into the centres of the plane sides of a rotor is an unrestricted space having two relatively long plane sides and two relatively short concave curved sides, the two plane sides having rolling contact with the bearing elements on the engine shaft. The plane sides of the space within the rotor are longer than the plane sides of the shaft to permit the rotor to slide transversely of the shaft.

Where the two external curved surfaces of a rotor meet there are cylindrical recesses to receive bearing elements, e.g. in the form of rollers.

The rotors thus disposed on the central shaft are situated in the rotor chambers and in operation the rotors slide on the curved walls of the chambers through the agency of the last-mentioned bearing elements and also slide across the engine shaft.

In order that this invention may be clearly understood and readily carried into effect, the constructional features of a two-rotor engine is shown by way of example in FIGURES 1 to 20 of the accompanying drawings, in which:

FIGURE 1 is a view in axial section of an engine without the shaft and rotors. In this figure can be seen: an end cover disc I with water flow channels 4, an outer race 11, an inner race 8, fixing screws 6 and washers 7 for securing a plate IX having a seal 12, nuts 2, washers 3 and studs 1 for engine assembly, a shouldered connection 17 to the next disc II and a central opening 5 for the engine shaft.

The disc II has shouldered connections between the cover I and a further disc III, and includes other parts of the water channels 4 and intercommunicating passages, part of the housing for the races 11 and 8, and a continuation of the opening 5 for the engine shaft. The discs I and II together form a bearing box A. In turn the disc II forms one side closure of a rotor box B. The central disc III of the box B has a chamber in which a rotor 15 operates, an exhaust port 14, a by-pass passage 13, two shouldered connections 17 between the disc II and a further disc IV and an extension of the intercommunicating water passage 4. The discs II, III and IV together form the rotor box B.

The disc IV, has two shouldered connections between the discs III and a further disc V, water passages 4, part of a central bearing housing, and a continuation of the opening 5 for the engine shaft.

The disc V has two shouldered connections between the disc IV and a further disc VI, water flow passages 4, the other part of the central bearing housing, and a further continuation of the opening 5 for the engine shaft. Together the discs IV, V form a central bearing box C.

The disc VI has a chamber 16 in which the second rotor operates, two shouldered connections between the disc V and a further disc VII and a spark plug 9. This disc together with the discs V, VII, forms a second rotor box D.

The disc VII has two shouldered connections 17 between the disc VI and another cover disc VIII, water flow channels 4, part of another bearing housing, and a further continuation of the opening 5 for the engine shaft.

The cover disc VIII has water flow channels 4, the other part of the latter bearing housing, a final continuation of the opening 5 for the engine shaft, screws 6 and washers 7 for mounting another plate IX having a seal 12, nuts 2 and washers 3 on the studs 1. The discs VII and VIII together form a bearing box E.

Gaskets 10 are provided between the mating flat surfaces of the discs.

Figure 4:
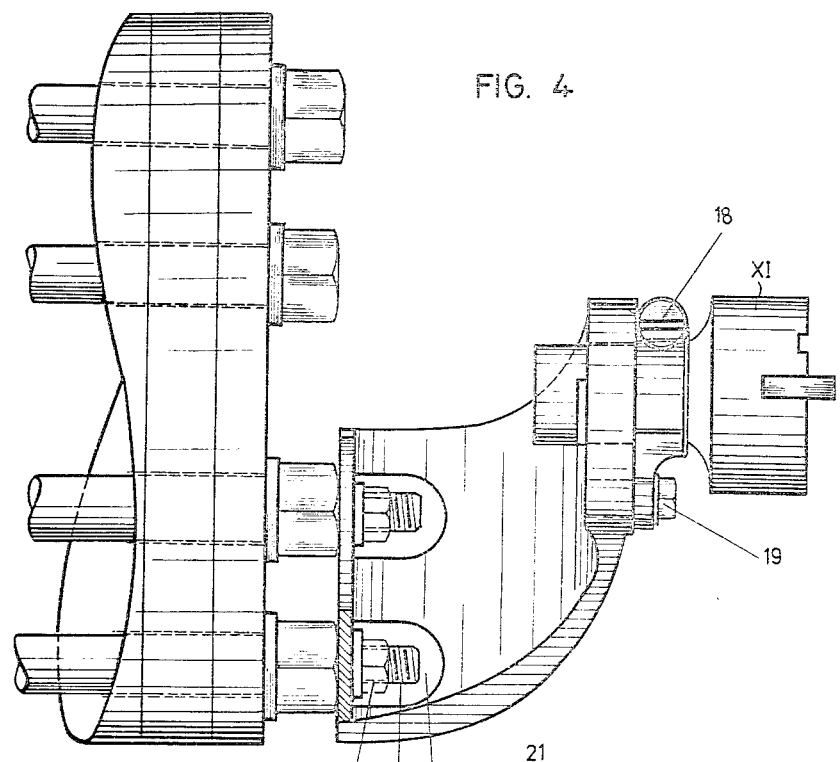
Figure 5:
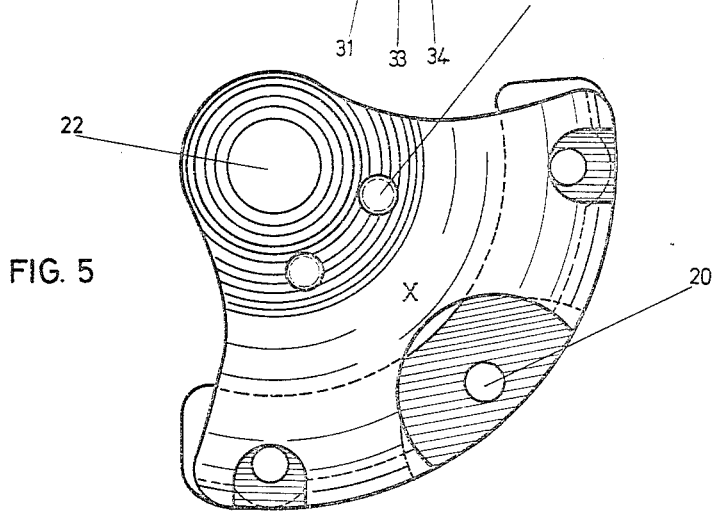
Figure 6:
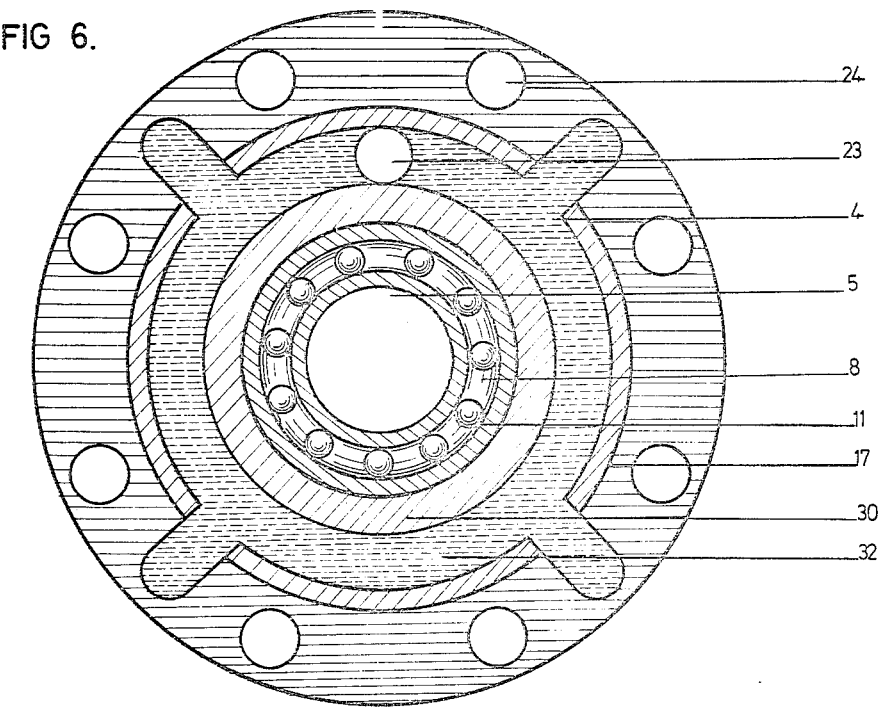
Figure 7:
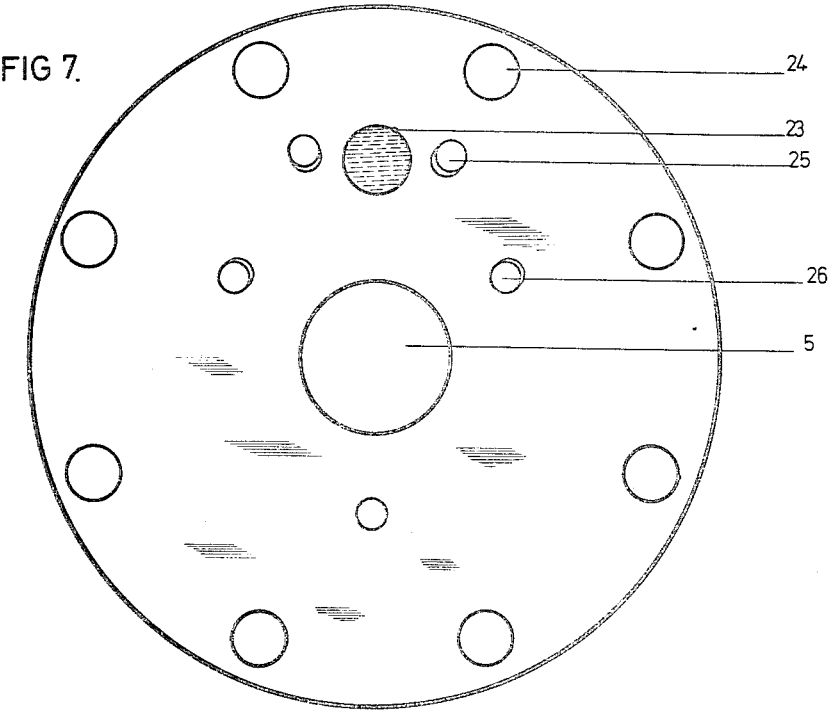
Figure 8:
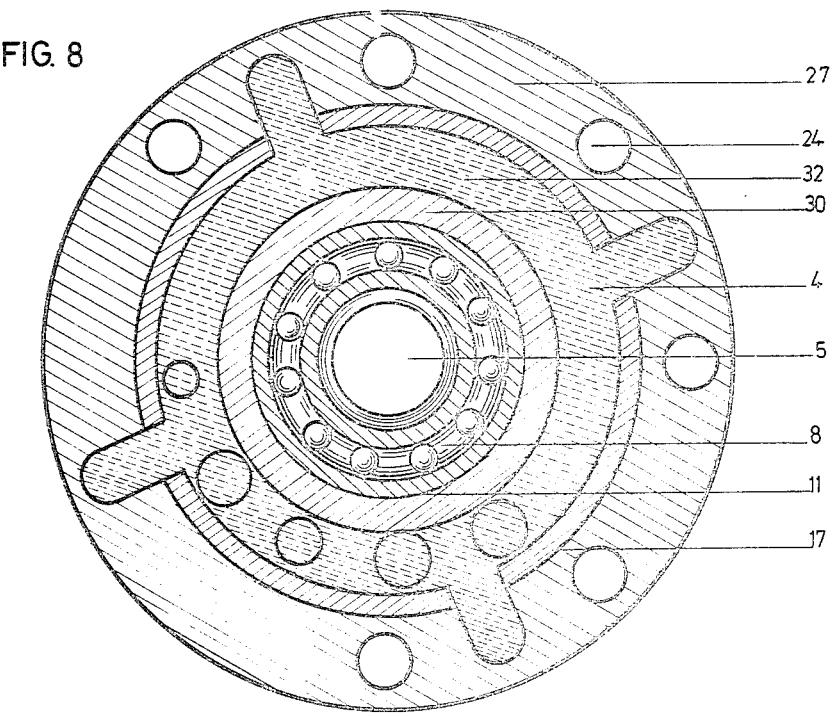
Figure 9:
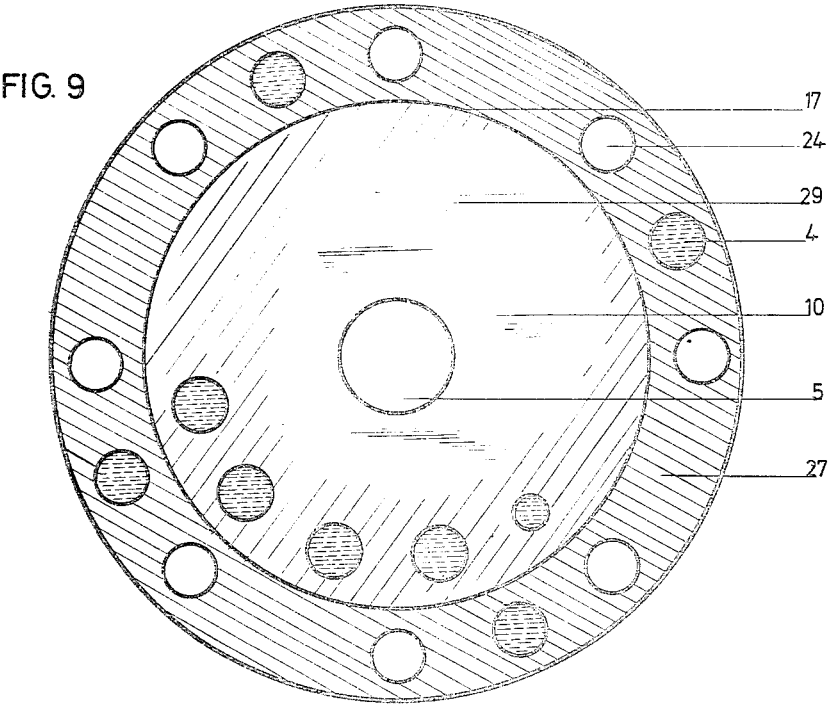

FIGURE 4 is a side elevation of a portion of the engine fitted with an element X adapted to bear a distributor XI, the element X being secured by nuts 31 to extensions of the engine-assembly studs, with a retaining clip 18 and securing and adjusting screws 19 for the distributor;

FIGURE 5 is an elevation of the element X for the distributor, with holes 20 receiving the stud extensions, tapped holes 21 for the screws 19 and a hole 22 for connecting the distributor to the engine shaft;

FIGURE 6 is an end view of the cover disc I from the side which makes contact with the disc II, with an annular water passage 32 and intercommunicating passages 4, an opening 23 for communication with the exterior, the opening 23 being in this particular case the exit for the cooling liquid and being disposed at the top of the engine, on the left in the drawing since the figure is turned through 90°, stud-receiving holes 24, part of a shouldered connection 17, and a contact surface 30 with the disc II, the races 8 and 11 and the central opening 5 for the engine shaft. The disc I is in all parts of the same shape as the disc VIII the orifice 23 therein being disposed at the bottom of the engine and serving for the entry of the cooling liquid;

FIGURE 7 is an outside end view of the disc I and also shows two tapped holes 25 for the fixing of the flange of the water pipe from the radiator and three tapped holes 26 for the mounting of the plate IX;

FIGURE 8 is an end view from the sides of the discs II, IV which contact the discs I, V respectively. In this figure can be seen the holes 24, a circular passage 32 and intercommunicating passages 4 for the cooling liquid, an inner contacting surface 30, the races 8 and 11, the central opening 5 for the engine shaft, and an outer contacting surface 27;

FIGURE 9 is a view of the disc II or IV from the opposite side showing surface 29 which closes off one side of a rotor chamber and includes an eccentric portion rubbed by the rotor and an outer contacting surface 27.

FIGURES 6, 7, 8 and 9 are turned through 90° so that the left-hand part of the figures corresponds to the top part of the engine. However, the subsequent figures are in the as-assembled position.

Figure 10:
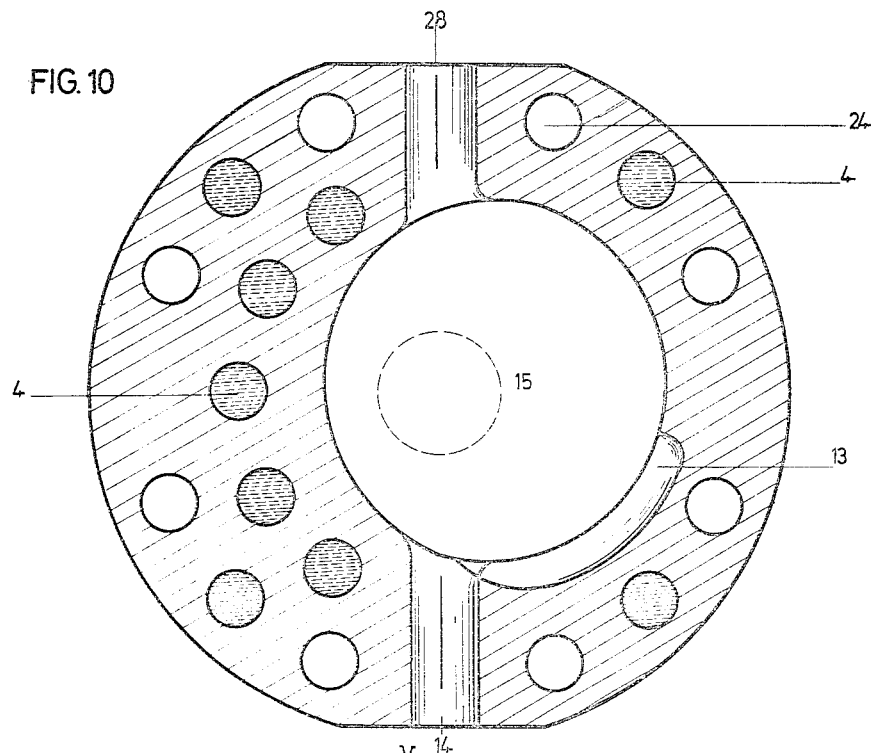
Figure 11:
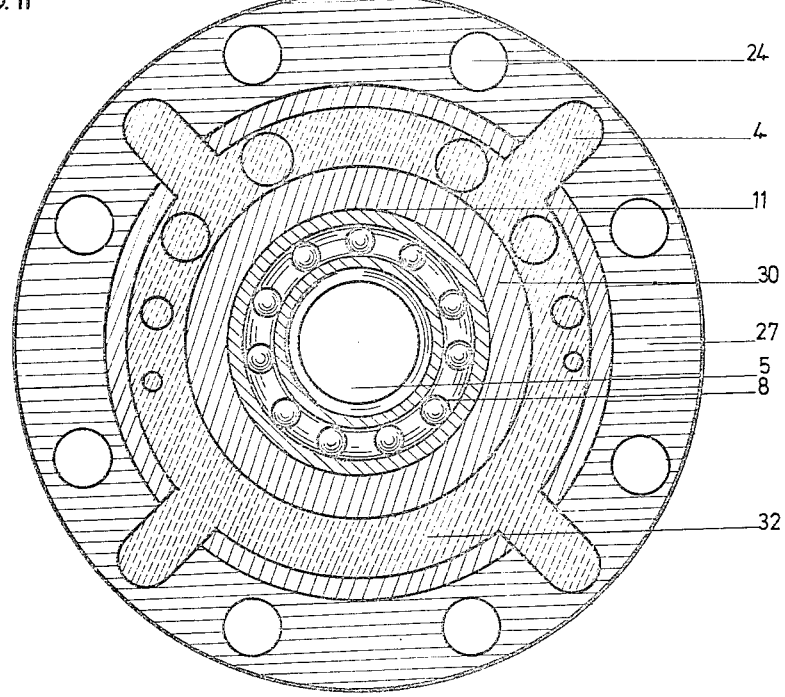

FIGURE 10 is a cross-section through the central disc III of the rotor box B, in its as-assembled position. In this figure can be seen an inlet port 28, the exhaust port 14 and the by-pass passage 13, and the eccentrically disposed rotor chamber 15. Around the chamber 15 are the passages 4 providing communication for the cooling liquid to the remainder of the engine, and the holes 24;

FIGURE 11, which is a view similar to FIGURE 6 and 8, shows the side of the disc V which contacts the disc IV. In this figure can be seen the outer annular contacting surface 27 with the holes 24. The annular portion is also formed with the holes 4 which communicate with an annular passage 32 for the cooling liquid and with the remainder of the engine. In the passage 32 are further cavities which communicate with the remainder of the engine. There is also an inner contacting surface 30.

Figure 1:
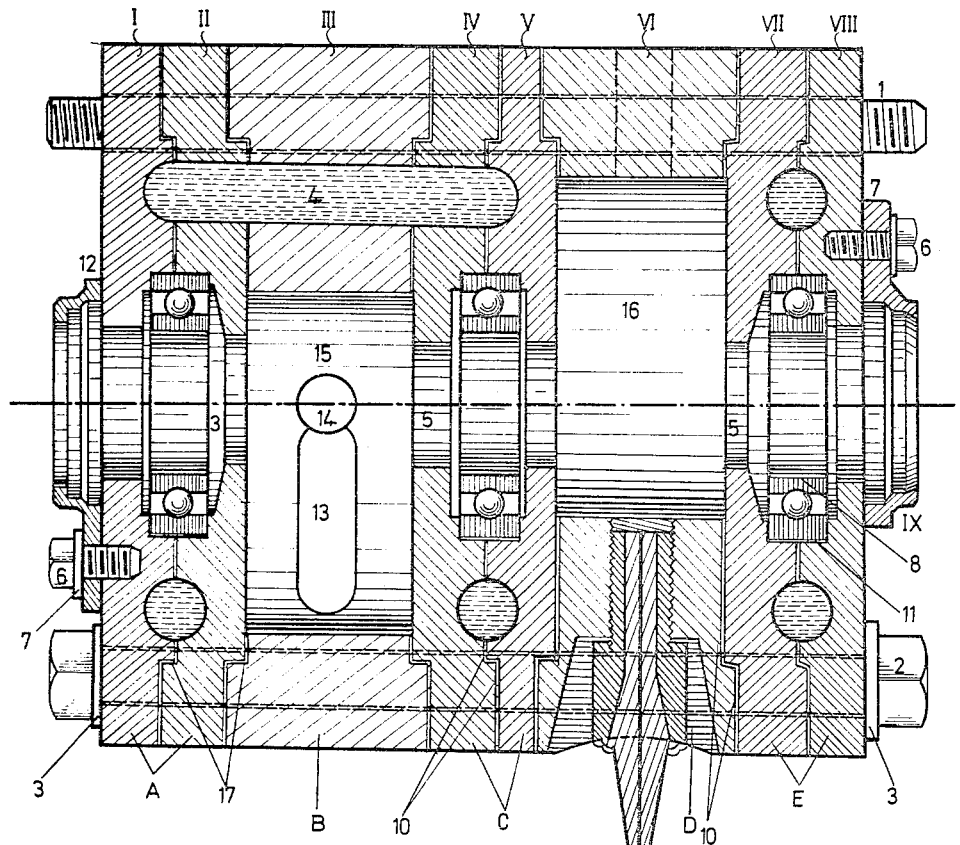
Figure 2:
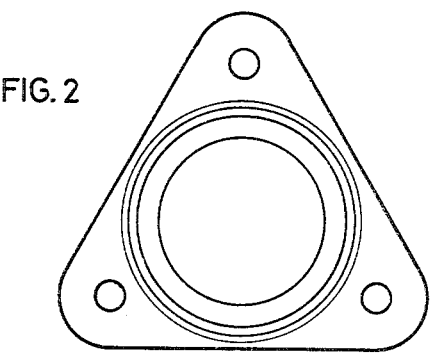
FIGURE 2 shows the plate IX in end view, with three holes to receive the screws 6 and one central hole for the engine shaft.
Figure 3:
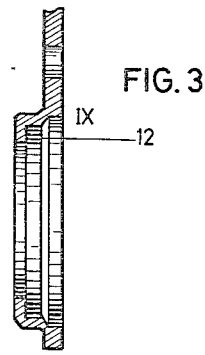
FIGURE 3 is a cross-section through the plate IX and shows the seal 12.
Figure 12:
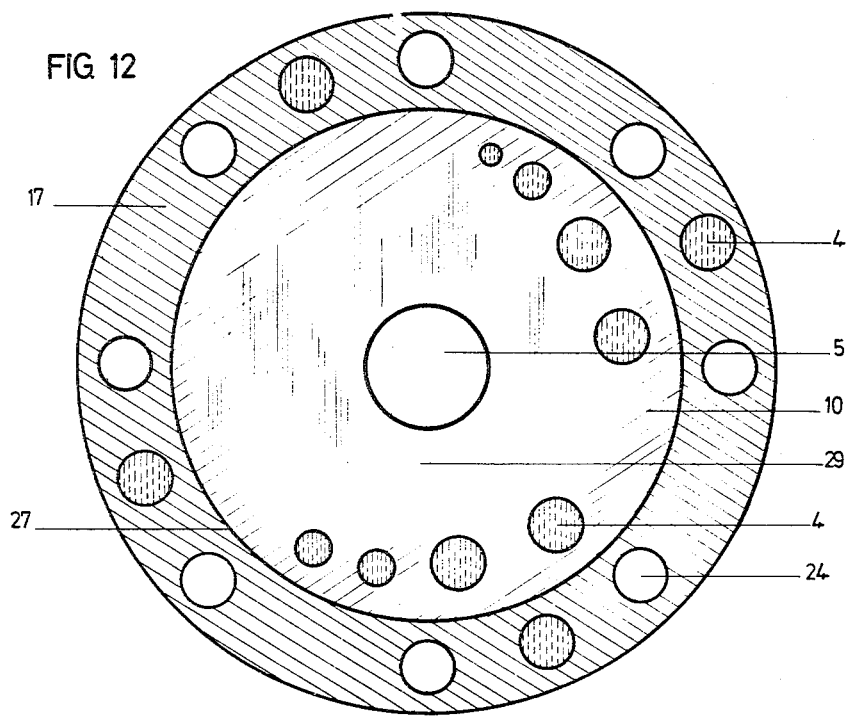
Figure 13:
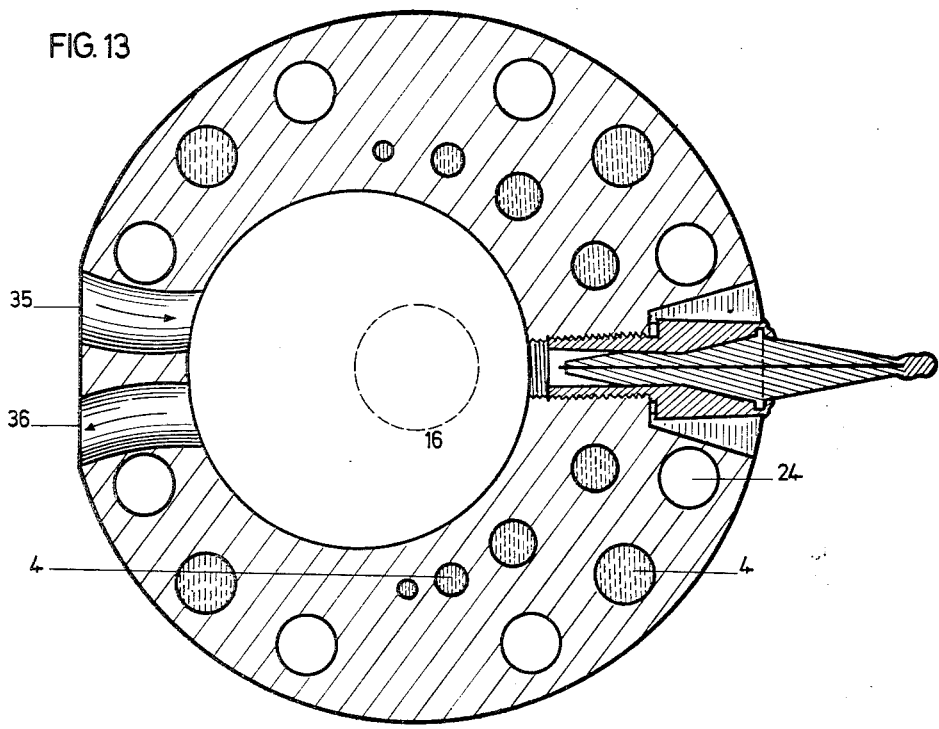
Figure 14:
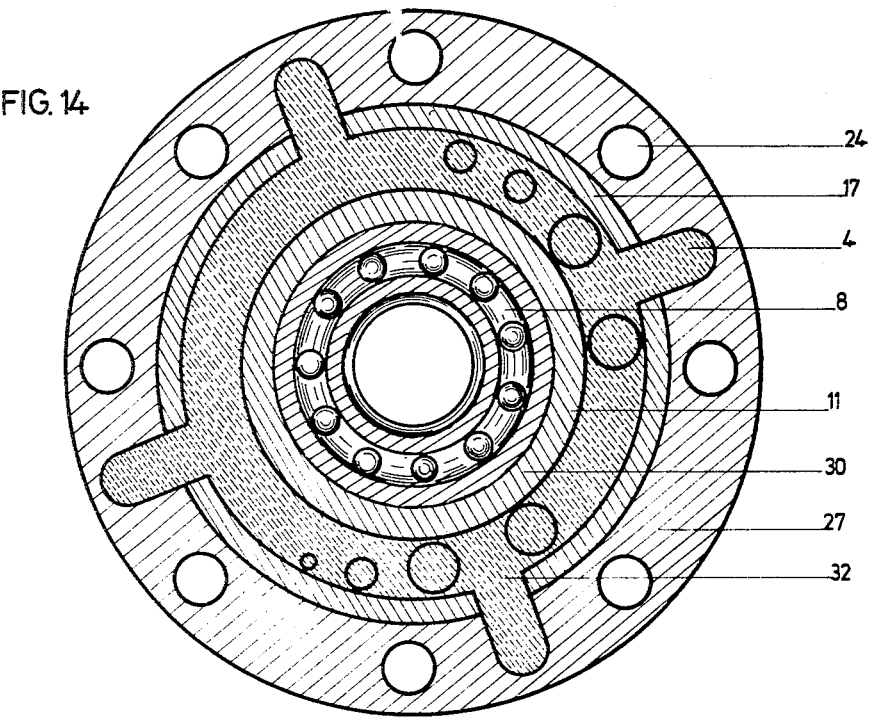
Figure 15:
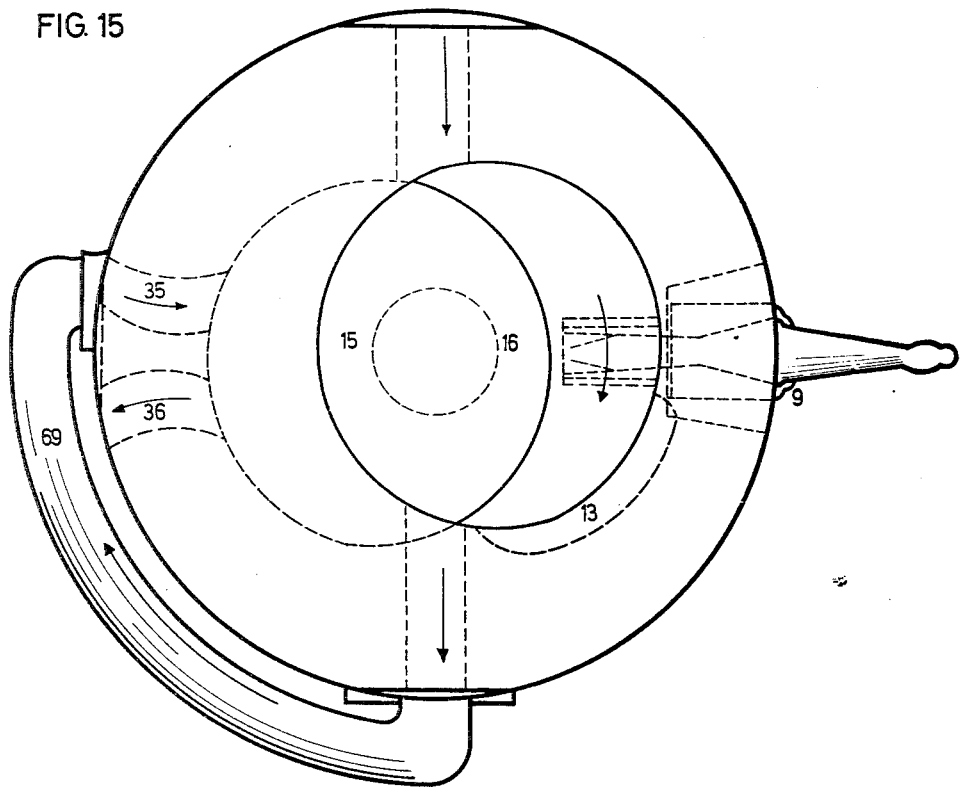

FIGURE 12 shows the side of the disc V which is directed towards the disc VI. This side includes a central surface 29 closing off one side of the eccentric chamber and having an eccentric rubbed portion formed with a circular hole 5 for the engine shaft. Around the surface 29 is a contacting surface 27 provided with communicating holes 4 for the cooling liquid and the holes 24;

FIGURE 13 is a cross-section through the central disc VI of the rotor box D. There can be seen the spark plug 9, an exhaust port 36 and an inlet hole 35, the holes 24 and intercommunicating passages 4 for the cooling liquid, and the rotor chamber 16;

FIGURE 14 is a view of the disc VII, showing the surface which is directed toward the disc VIII. It also shows the holes 24, the cooling passages 4, the inner and outer contacting surfaces 30 and 27, a cooling passage 32 formed with intercommunicating holes 4 and the races 8 and 11;

FIGURE 15 is a diagrammatic view showing the relative angular positions of the chambers 15 and 16. In the chamber 15 there can be seen the inlet port 28, the by-pass passage 13 and the exhaust port 14 with its transfer passage 69 communicating with the inlet port 35 of the chamber 16. The spark plug 9 and the exhaust port 36 are also shown;

FIGURE 16 shows the shaft and rotors for operation in the engine block of FIGURE 1. A first end sleeve 42 is shown for journalling in the bearing of bearing box A, a rotor XII′ to be disposed in the chamber 15, a central sleeve 43 to be journalled in the bearing in the bearing box C and having securing clips 45 to prevent relative axial displacement. Also shown is the rotor XII to be disposed in the chamber 16 and a second end sleeve 42 for journalling in the bearing in the bearing box E. In the rotors are bearing elements 37 and 37′ for maintaining constant contact in rotation with the curved walls of the rotor chambers. Within the rotors are unrestricted spaces 39 having plane walls having rolling contact with bearing elements 38 on the engine shaft. At both ends where the sleeves 42 are disposed, the engine shaft has a section of reduced width, to provide abutments with the sleves 42 and prevent relative axial movement;

FIGURE 17 shows one end of the engine shaft XIII with its sleeve 42, in section;

FIGURE 18 is a view in cross-section of the shaft XIII in the part received inside the rotor XII′. In this figure there can be seen recesses 46 receiving bearing elements 38 in the form of rollers for contact with the walls 39;

FIGURE 19 is a cross-section through the shaft and central sleeves 43 and shows one of its securing clips 45;

FIGURE 20 is a cross-section through the opposite ends of the shaft with its sleeve 42. In FIGURES 17, 19 and 20 can be seen the plane surfaces of the shaft and the corresponding internal shape of the sleeves.

The combined operating cycle of the rotors XII′ and XII in the chambers 15, 16 is explained graphically in FIGURES 21–26 which are turned through 90° so that the left-hand part of the drawing corresponds to the top in the assembly of the engine.

Figure 21:
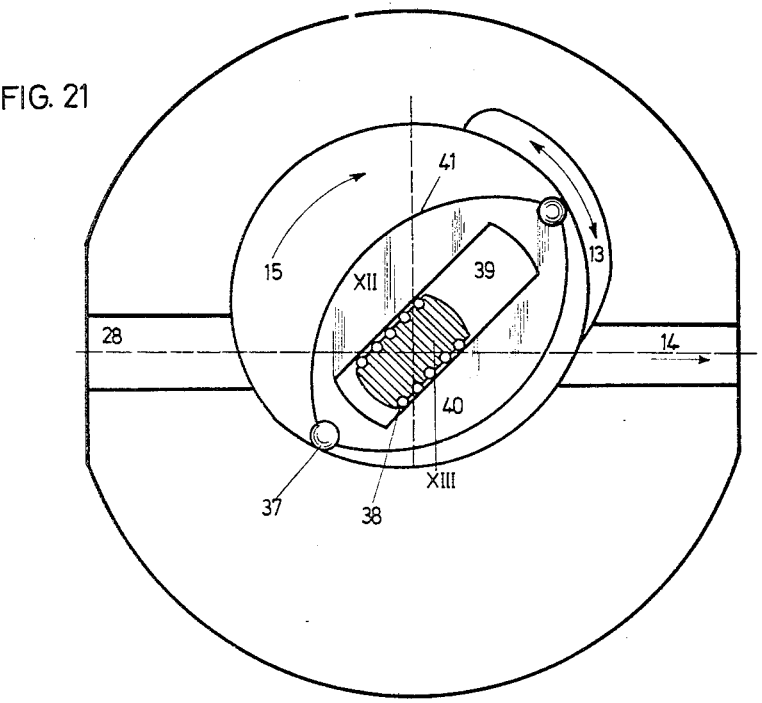
Figure 22:
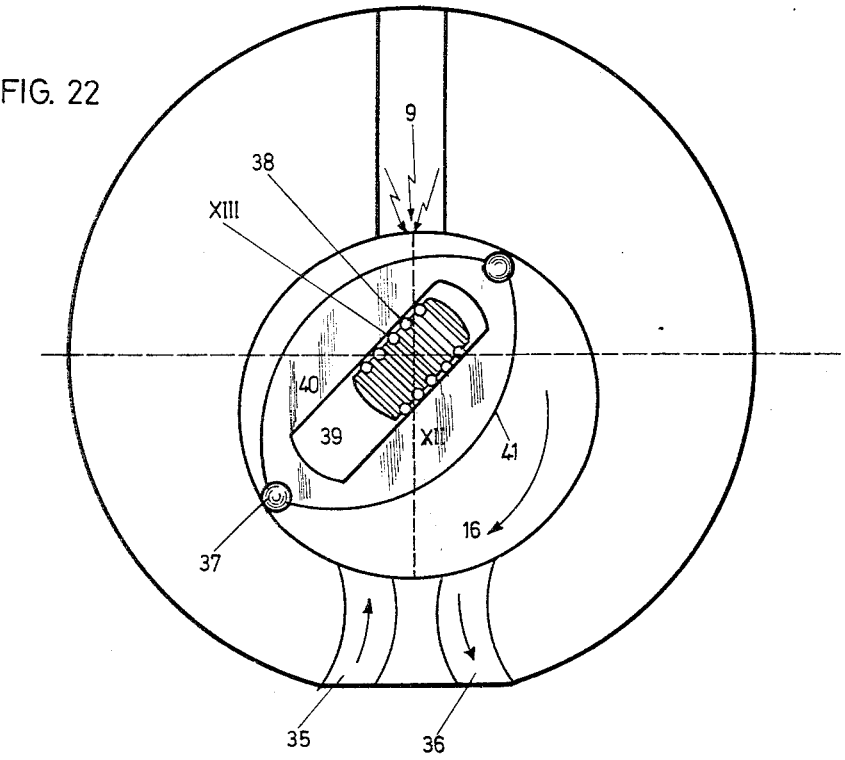

Referring to FIGURES 21 and 22, there can first be noted the position of the operating chambers 15, 16 with their respective inlet and exhaust ports 28 and 14, and inlet and exhaust ports 35, 36 and spark plug 9, relatively to the engine shaft. FIGURE 21 shows the circular part of the chamber 15 below the horizontal chain line with inlet and exhaust port 28 and 14 at either end of this part and the by-pass passage 13 in the non-circular part. FIGURE 22 shows the circular part of the chamber 16 above the horizontal chain line with the spark plug 9 in this part and the inlet and exhaust ports 35 and 36 in the non-circular part. The axes of symmetry of the chambers 15 and 16 are superimposed in a single plane with the chambers disposed at 180° to one another. In FIGURE 21, there can also be seen the rotor XII′ and central shaft XIII. In this figure the rotor is in a position where the by-pass passage 13 is effective. The by-pass passage 13 serves to limit the inlet and exhaust portions of the cycle by equalising the pressure at both sides of the rotor when the quantity of mixture supplied to the chamber is exactly the amount required to supply the chamber 16. Each rotor rotates clockwise and in following the internal curved perimeter of its chamber it slides to and fro transversely of the engine shaft. In FIGURE 22 the rotor XII is shown in its simultaneous position with the rotor of FIGURE 21 at the time when compression is being effected on one side of the rotor and on the other side the burnt gases are being scavenged through the exhaust port.

Figure 23:
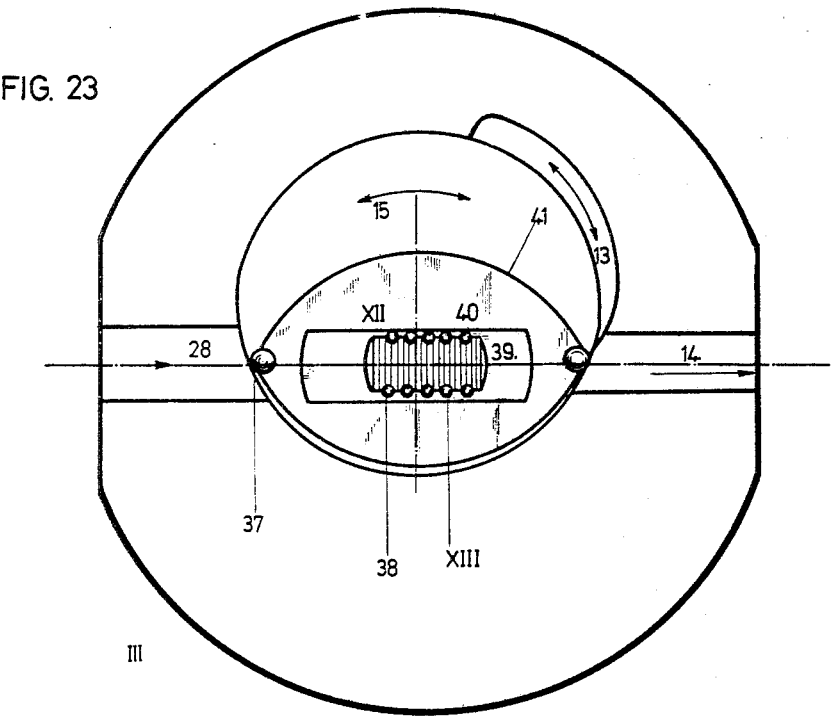
Figure 24:
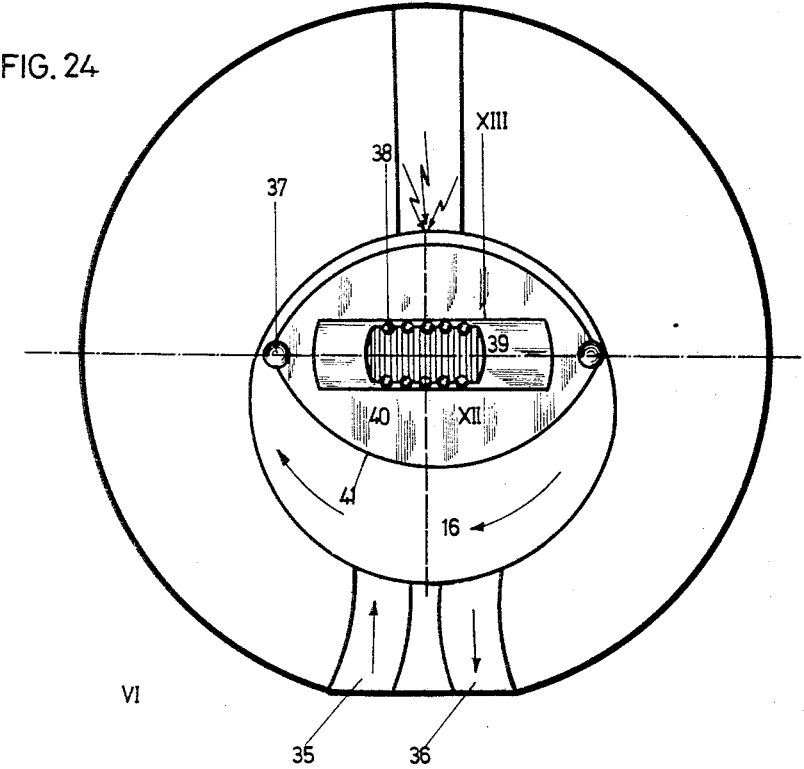

In FIGURES 23 and 24 respectively, the rotor XII′ is shown in a position corresponding to initiation of the inlet and exhaust portions of the cycle on opposite sides of the rotor, while in FIGURE 24 combustion is being produced by ignition at the time of maximum compression.

Figure 25:
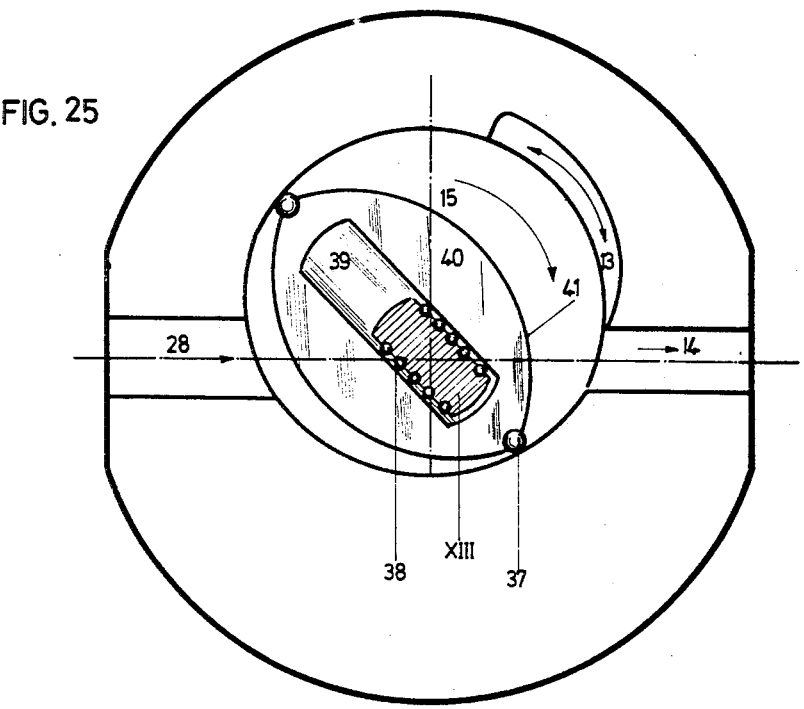
Figure 26:
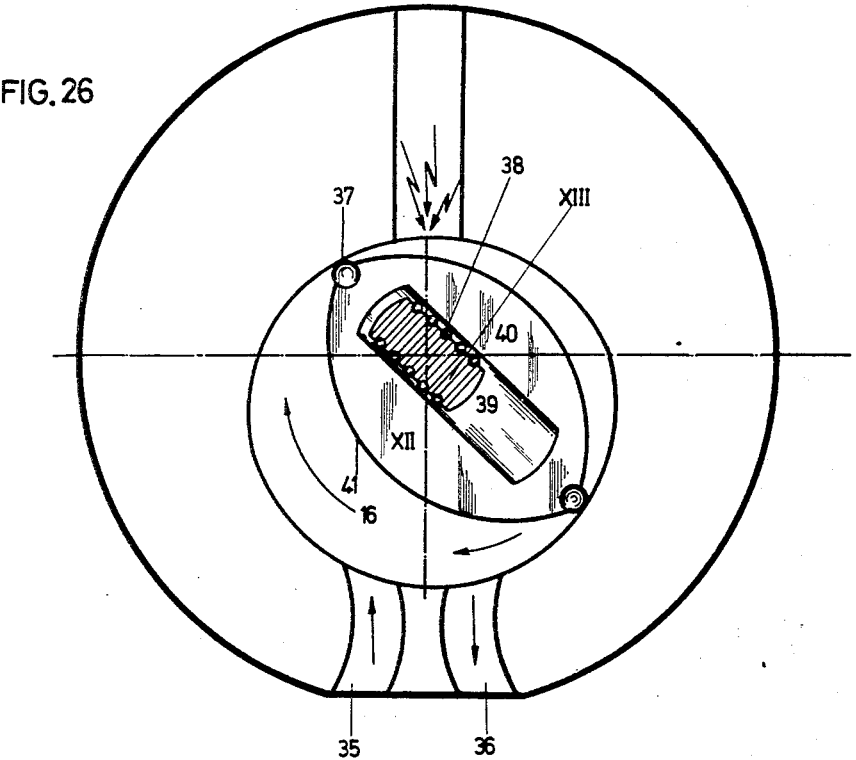

In FIGURES 25 and 26 respectively, the rotor XII′ is shown in a position during the inlet portion of the cycle on one side and the exhaust portion of the cycle on the other side while the rotor XII is shown in a position during the power portion of the cycle.

Figure 27:
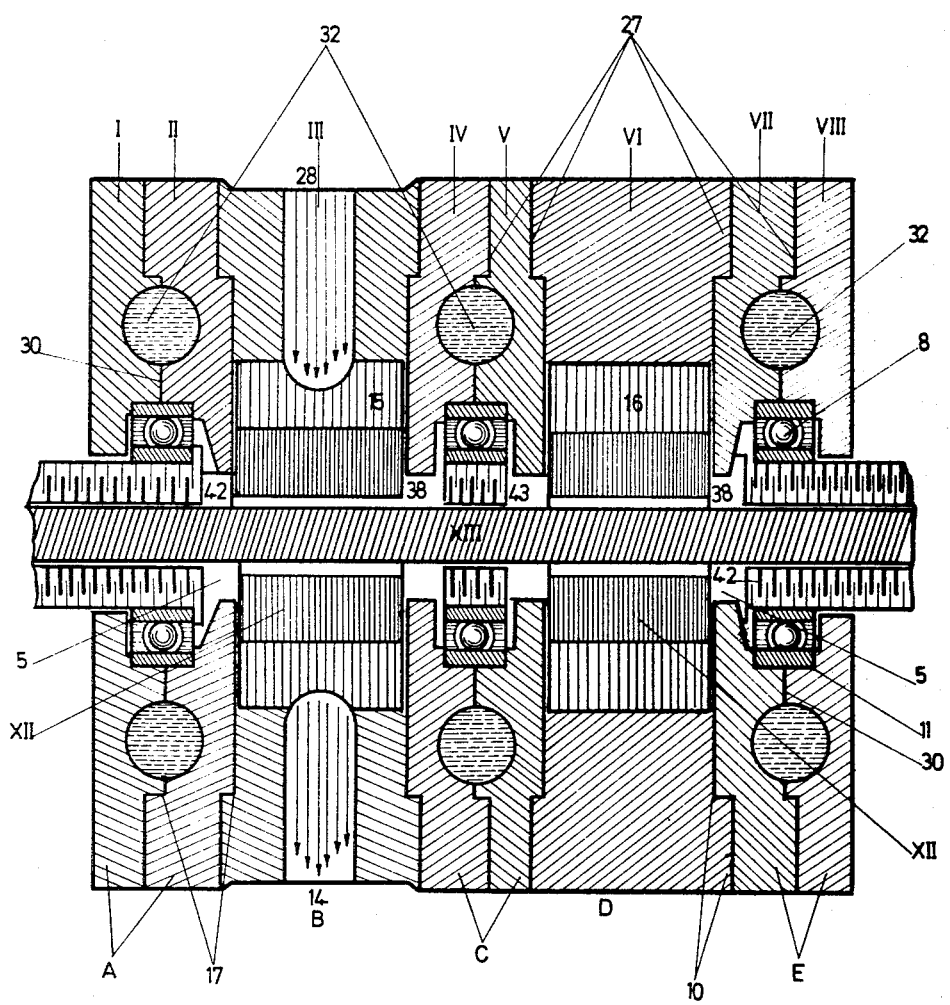

FIGURE 27 is a longitudinal vertical section through the engine assembled, with the respective shouldered connections 17 and with three bearing boxes A, C, E, and two rotor boxes B, D which when joined together form the block of the engine. In the bearing boxes there can be seen the bearings 8 and 11 with the sleeves 42, 43 and the thickness of the shaft XIII between its plane surfaces, showing the gap left between the block and the contours of the shaft. Also visible are the rotors in the chambers 15, 16, the openings 39 receiving the shaft with a gap between the shaft and the rotors and the gap serving to receive bearing elements disposed on the shaft for rolling contact with the rotor. Visible in the disc III in the rotor box B is the inlet passage 26 in the top part and in the bottom part the exhaust passage 14. With regard to the cooling liquid, there are passages 32 in the bearing boxes.

Figure 28:
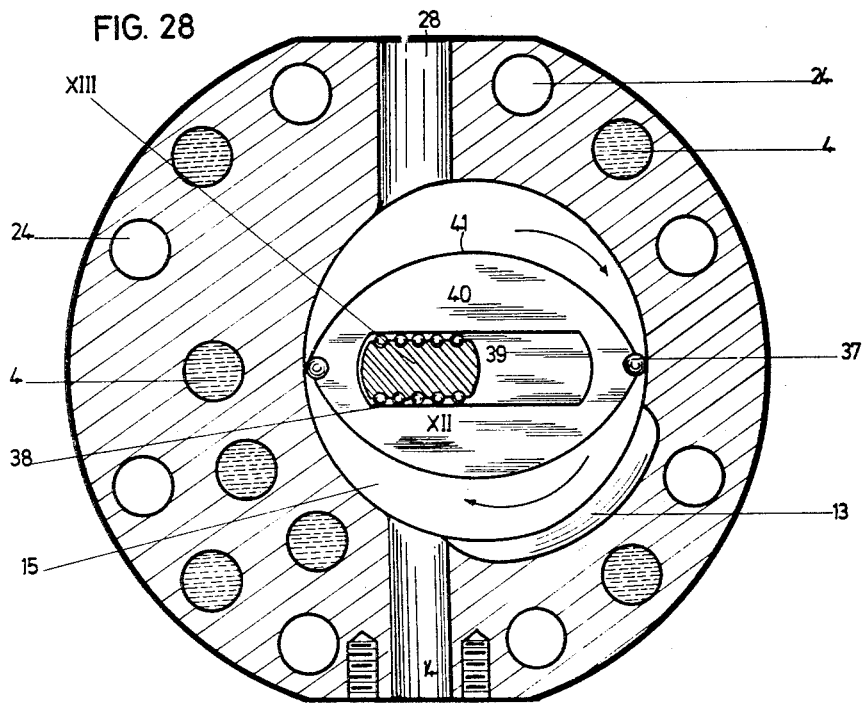

FIGURE 28 is a section of the central disc III of the rotor box B, with its mounting holes 24, its intercommunicating passages 4 for cooling liquid, the chamber 15, an inlet port 28 at the top and an exhaust port 14 at the bottom. Also visible is the rotor XII′ in a position at the end of the inlet and exhaust portions of the cycle on the respective sides of the rotor and at maximum transverse displacement in relation to the engine shaft XIII. In the central part of its plane surface 40 the rotor is formed with the space 39 enabling it to slide transversely of the shaft XIII, with the interposition of the rollers 38. At its ends there can be seen the rollers 37 enabling the rotor to follow the inside surface of the chamber 15. The plane surface 40 is the surface via which the rotor is in permanent engagement with a side cover of its rotor box.

Figure 29:
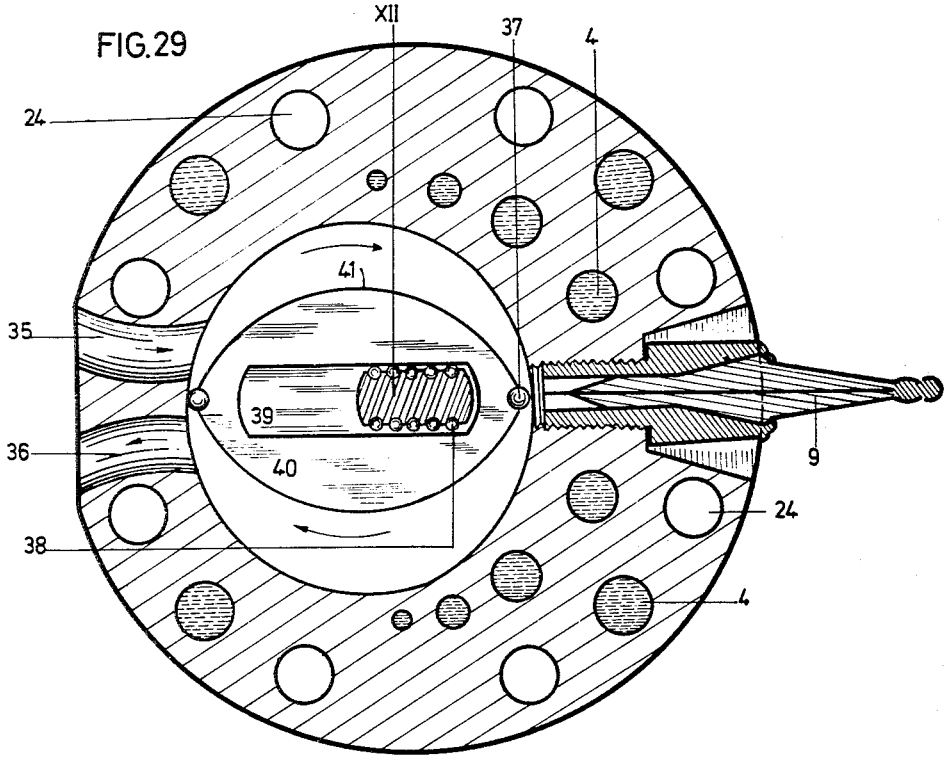

FIGURE 29 is a section of the central disc VI of the rotor box D, with the holes 24, the passages 4 for cooling liquid, and the chamber 16. At the top is a spark plug 9 and at the bottom are inlet and exhaust ports 35 and 36. The rotor is in a position where the shaft is at one end of the space 39.

The engine described, having two rotors and operating by spark ignition, can be modified to include a greater number of rotors, in which event the neutralising passage associated with the pumping rotor can be omitted since the purpose of such passage is to ensure that the pumping rotor introduces only sufficient mixture to the single power transmitting rotor during each cycle. The outline of a rotor chamber can vary as long as the circular arc is no more than 180° while the remainder is a curve traced as already described. The engine according to this invention is equally of use as a diesel engine as well as a spark ignition engine.

A description will now be given of a two-rotor diesel engine in which the outline of each rotor chamber is formed by a circular arc of less than 180° and the remainder is formed by a curve so shaped that a chord connecting any point on the closed curve to another point on its arc and passing through that point on the fixed chord of the arc which has been chosen as the engine centre, is constant. In this embodiment the centre point of the fixed chord coincides with the engine shaft.

Figure 30:
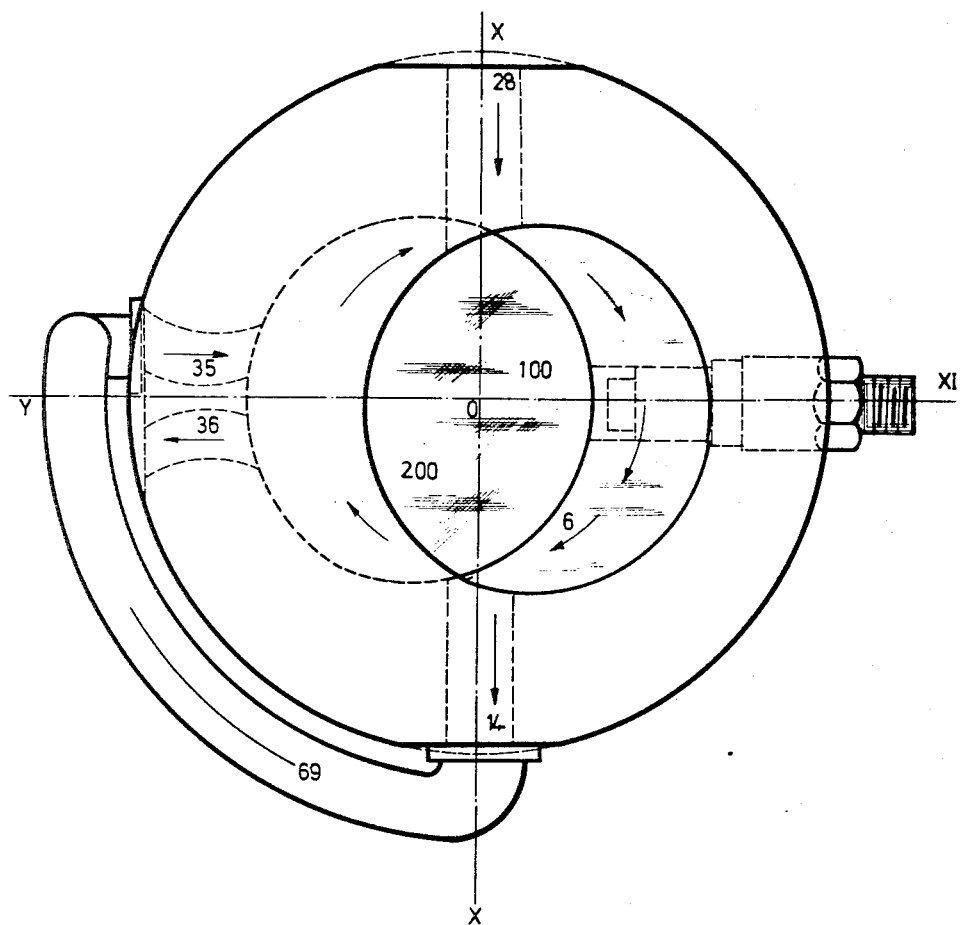

Clearly, in the case of a diesel engine there is no need for a by-pass passage in the pumping chamber, since only air is introduced via the pumping chamber and excess of air in the working chamber not only does not matter but even improves scavenging thereof. For a full understanding of this variant, a description will now be given with reference to the accompanying drawings in which:

FIGURE 30 is a diagram of the positioning of the chambers in the engine. There can be seen the superimposed chambers, the centres of the superimposed fixed chords passing through the engine centre O, where a line X—X intersects a line Y—Y, the former being a line including the superimposed chords and the latter being the axis of symmetry of the chambers.

The pumping and working chambers are here labelled 100 and 200 respectively and are angularly offset through 180°. Shown in the figure are the ports, transfer passage and injector necessary for operation of the engine. The inlet port 28 is in the chamber 100 at the top and the exhaust port 14 is at the bottom both on the line X—X, the intercommunicating passage 69 being provided to convey air to the chamber 200 via the inlet port 35 which is disposed just above the line Y—Y. The air is compressed by the rotor and combustion occurs at approximately 168° from the inlet port where the fuel is injected. The gases therefore expand as they burn and transmit a torque to the rotor, which in turn transmits a torque to the engine shaft and at about 168° after firing the burnt gases exhaust through the exhaust port 36 which is just below the line Y—Y.

FIGURES 31–38, which are turned through 90° to the left relatively to FIGURE 30, together show the operating cycle of the engine.

Figure 31:
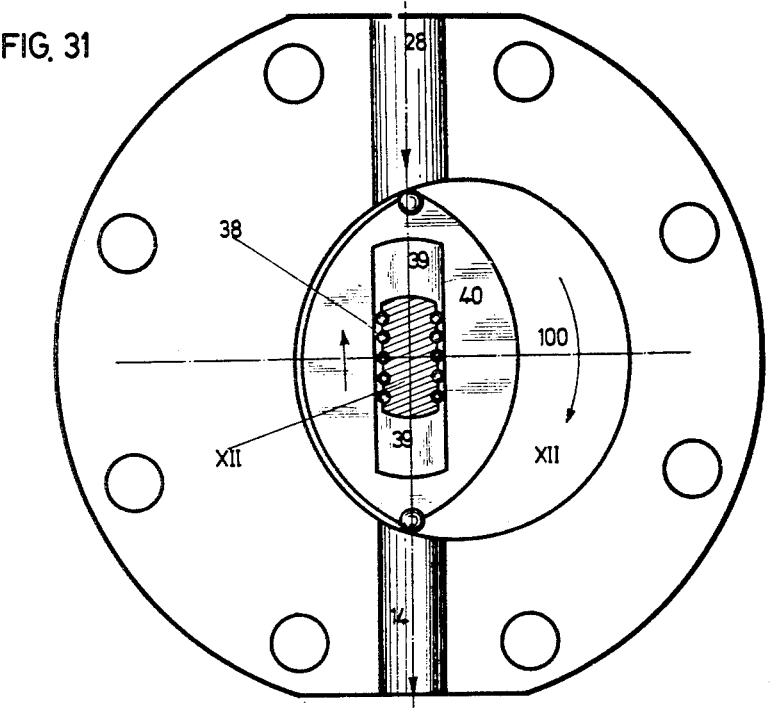

FIGURE 31 shows the rotor in the pumping chamber 100 in a position at the end of an inlet portion of the cycle on one side of the rotor and at the end of an exhaust portion of the cycle on the other side of the rotor.

Figure 32:
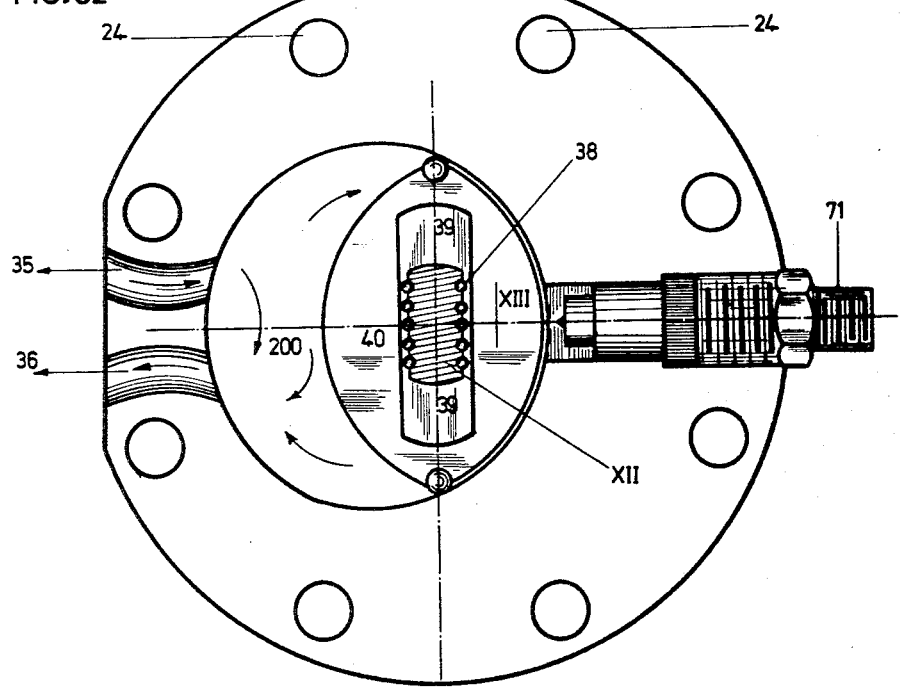
Figure 33:
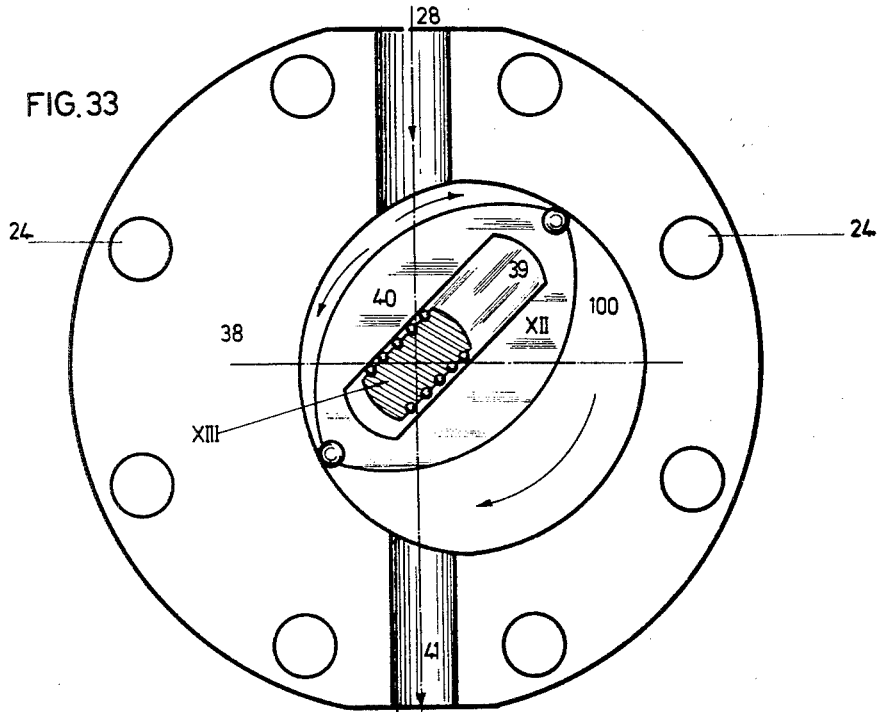
Figure 34:
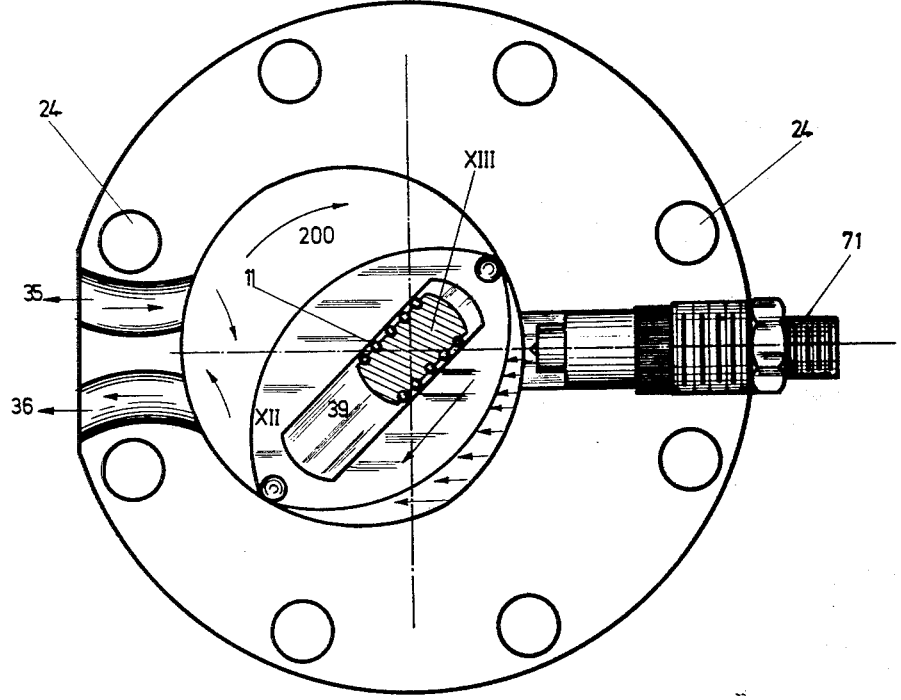
Figure 35:
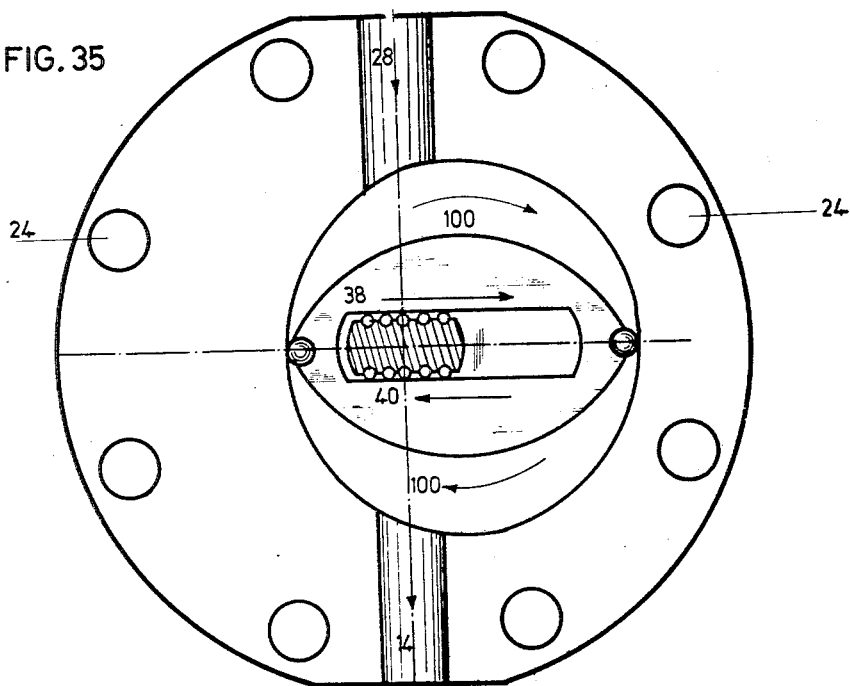
Figure 36:
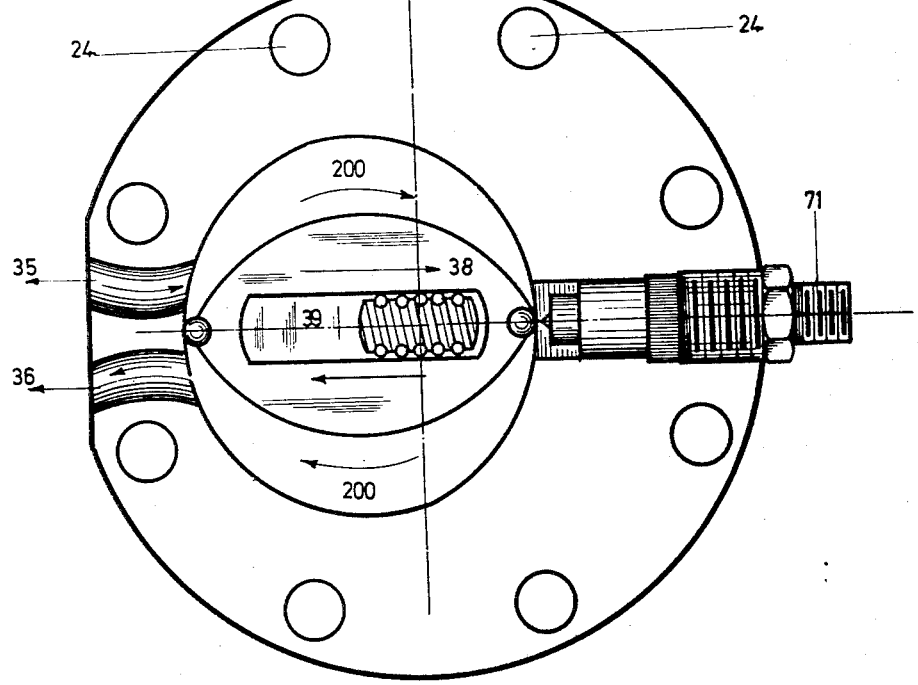
Figure 37:
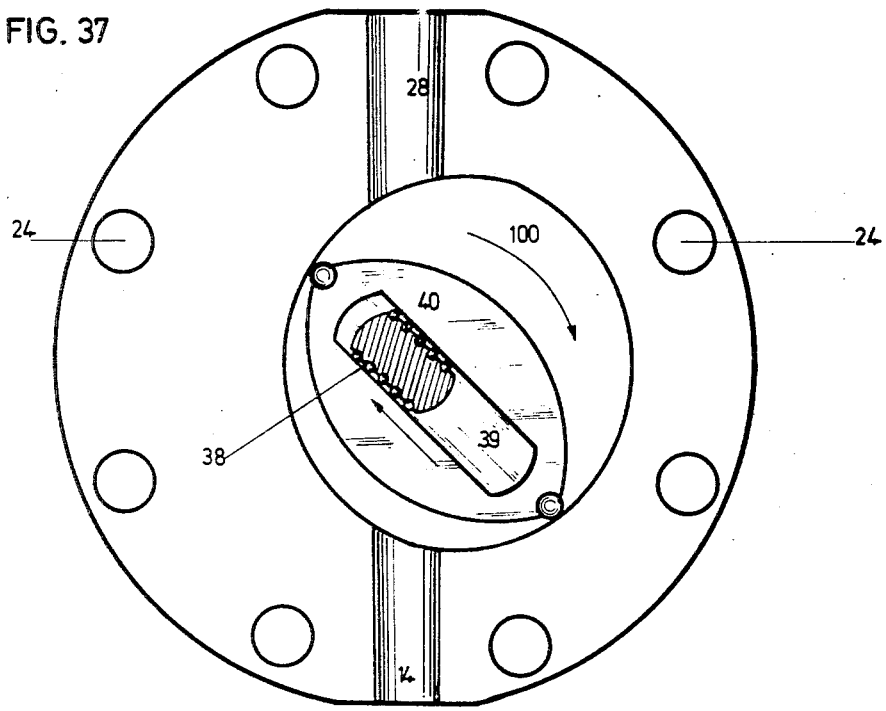
Figure 38:
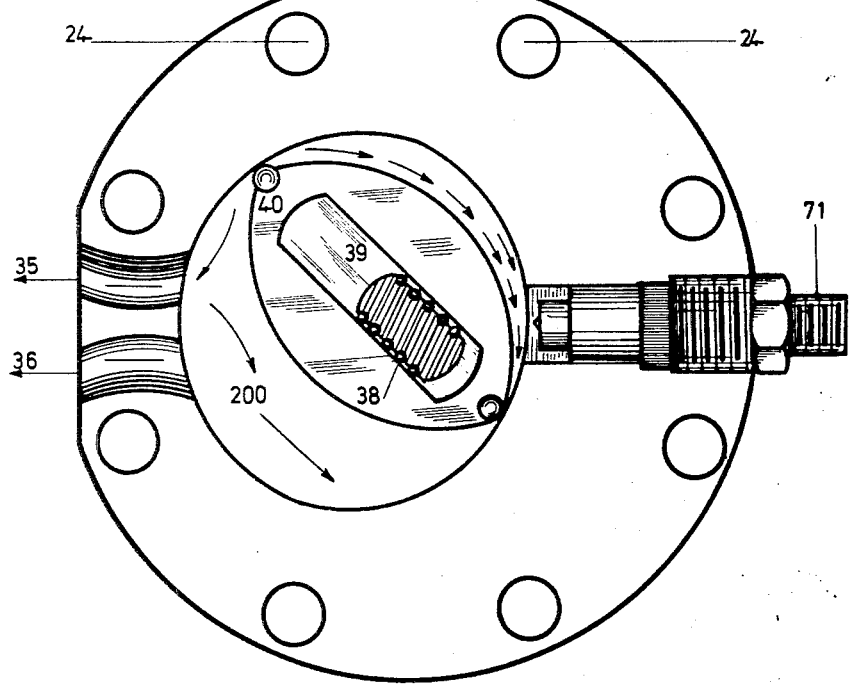

FIGURE 32 show the simultaneous position of the rotor in the working chamber 200 at a position of maximum compression;

FIGURE 33 shows the rotor in the chamber 100 in a position where one side is performing the inlet action and the other the exhaust action;

FIGURE 34 shows the rotor in the chamber 200 in a simultaneous position where one side of the rotor is being subjected to the pressure of the exploded gases while the other side is receiving a fresh charge of air through the port 35 with simultaneous scavenging of burnt gases through the exhaust port 36;

FIGURE 35 shows the rotor in the chamber 100 in a position of maximum displacement transversely of the engine shaft with its respective sides simultaneously performing inlet action by way of the port 28, and exhaust action by way of the exhaust port 14;

FIGURE 36 shows the simultaneous position of the rotor in the chamber 200 at maximum displacement transversely of the engine shaft with its respective sides performing the exhaust action via the exhaust port 36, and the intake action via the intake port 35;

FIGURE 37 shows the rotor in the chamber 100 in a position where one side of the rotor is drawing in air and the other side is exhausting it;

FIGURE 38 shows the rotor in the chamber 200 in its simultaneous position with one side compressing the air and the other forcing the gases through the port 36 and simultaneously receiving air via the port 35.

The following figures show the shaft and rotor of the engine shown in FIGURES 30 to 38.

Figure 39:
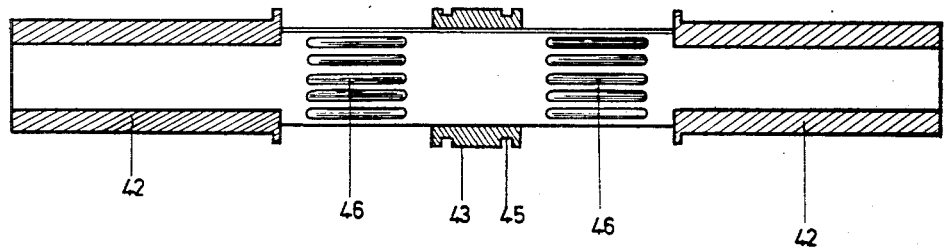
Figure 40:
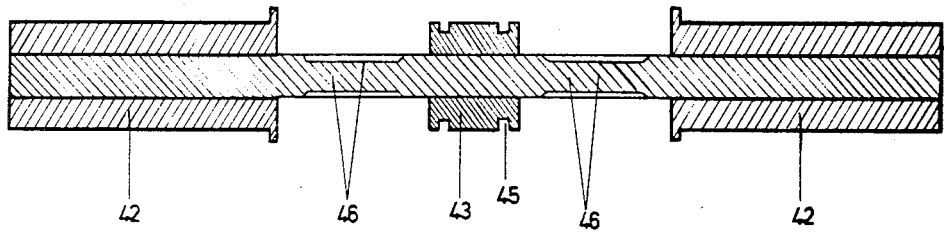
Figures 41, 42, 43:
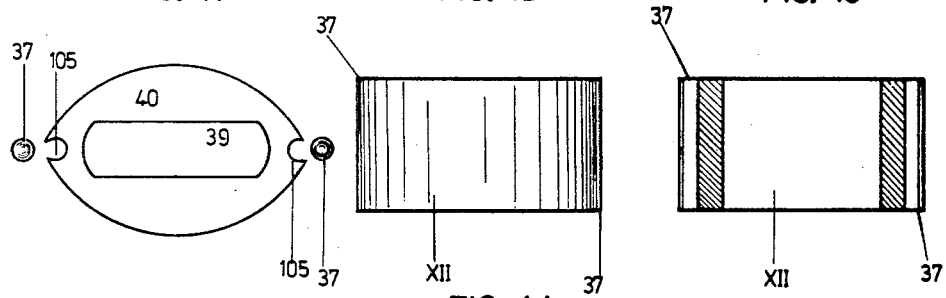

FIGURE 39 is a side view of the shaft, with a sectioned view of the sleeves 42 disposed at both ends of the shaft, and which shows the rebate or reduction in shaft width, providing abutments to retain the shaft in its axial position. At the centre of the shaft there can be seen in section the sleeve 43, showing the groove 45' for receiving the retaining ring or circlip and at its two lateral sides the recesses 46 on each side of the centre of the shaft, adapted to receive the roller elements;

FIGURE 40 is a sectioned view of the shaft, showing the sleeves 42 at the shaft ends and at the centre the sleeve 43 with the two grooves 45' adapted to receive the retaining rings and at the two sides of the sleeve 43, in the sections to receive the rotors, there can be seen the recesses 46 for the roller elements;

FIGURE 41 is an exploded end view of the rotor XII showing the plane rubbing surface 40, the central space 39 the contour of the two curved convex surfaces 104 and at the two longitudinal ends the recesses 105 to receive rollers 37;

FIGURE 42 shows the rotor XII in side view, showing the curved convex surface 104, and at its two ends there can be seen the rollers 37;

FIGURE 43 is a view of the rotor sectioned along its major central plane, there being visible at the two ends of the section the rollers 37 and in the central part the bearing surface 107 for the space 39.

As will be apparent, in this case of a diesel engine the pumping chamber can be omitted, the air being supplied by a turbine or some other external means.

Figure 44:
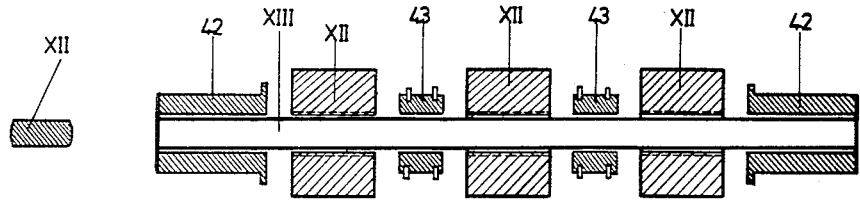
Figure 46A:
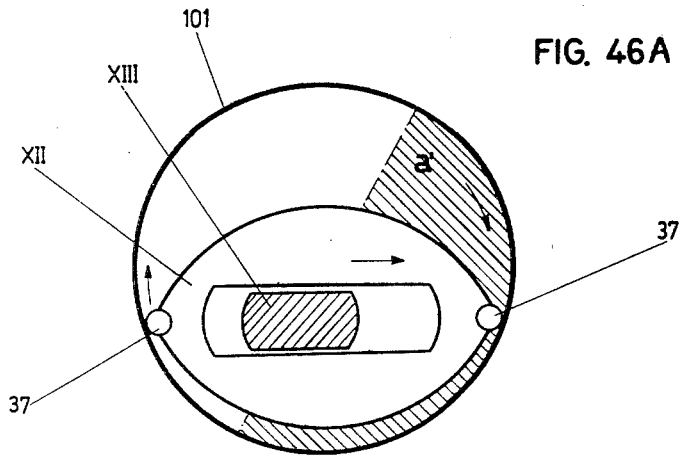
Figure 46B:
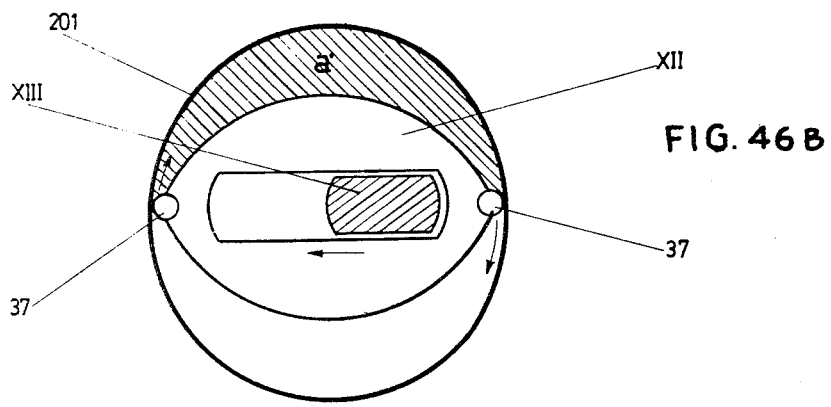
Figure 46C:
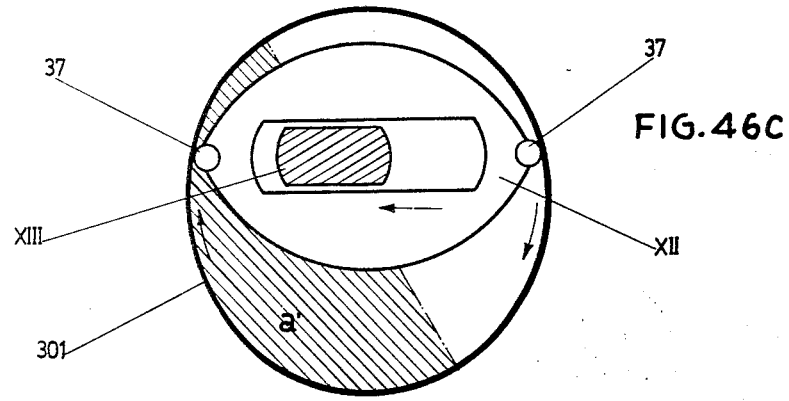
Figure 47:
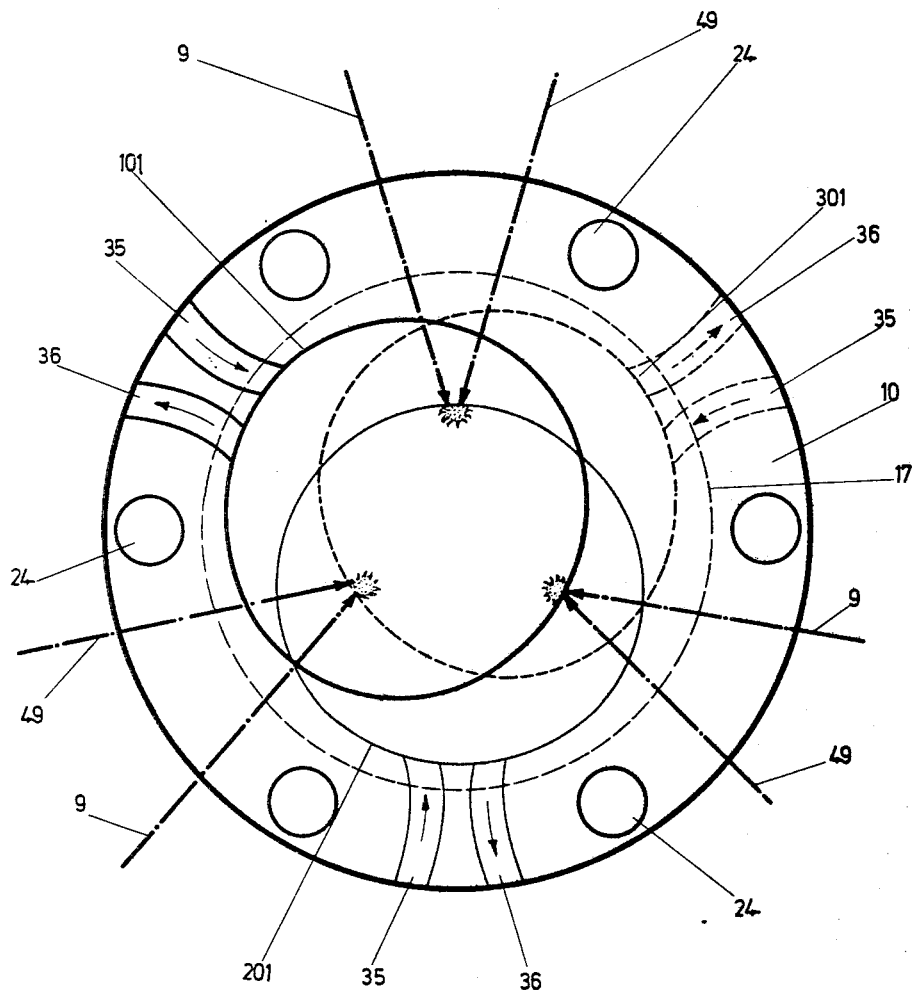

FIGURES 44 and 45 are respectively sections through an engine shaft and rotor assembly and through a three-rotor engine including such assembly;

FIGURES 46A, 46B and 46C show simultaneous positions of the rotors in their chambers;

FIGURE 47 shows the relative positions of the chambers

FIGURES 48A, 48B and 48C and 49 are two views respectively similar to the two previous ones but of an engine having a pumping chamber and an intercommunicating passage;

FIGURE 50 diagrammatically shows the shape of one kind of chamber;

In FIGURES 44 and 45 there can be seen the rotors XII with their rollers 37 disposed on the shaft XIII with the interposition of rollers 46 to enable the rotors to slide on the shaft. The shaft is mounted in sleeves 42 and 43 journalled in bearings 8, 11. Also visible are the cooling passages 4, the studs and nuts 2 and the various discs *a, b, c, d, e, f, g, h, j, k, l* constituting bearing boxes F, H, K, M and rotor boxes G, J, L.

FIGURES 46A, 46B and 46C and 47 show the position of the rotors in the chambers at a particular time and the position of the chambers in the assembled engine. As already stated the chambers are of a form wherein a chord passing through the centre of the engine and joining two points on the periphery of the chamber is constant and is characterised in that the outline of the chamber, as can be seen in FIGURES 46A, 46B and 46C, is formed by a circular arc and by a curve meeting the former condition.

In the case shown in FIGURES 46 and 47, the arc which forms the chambers is a semicircle corresponding to the hatched zone *a'* with the engine centre offset in the chord from its centre; the position of the rotors XII and engine shaft XIII at a particular time in the chambers 101, 201, 301 is clearly visible. This engine is supplied by an external pump and has inlet ports 35 and exhaust ports 36. Also shown are injecting and ignition means 9, 45 which can be omitted in the case of a diesel engine.

Figure 48A:
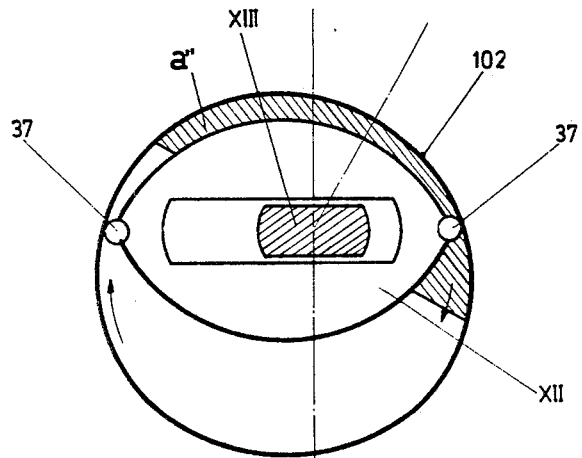
Figure 48B:
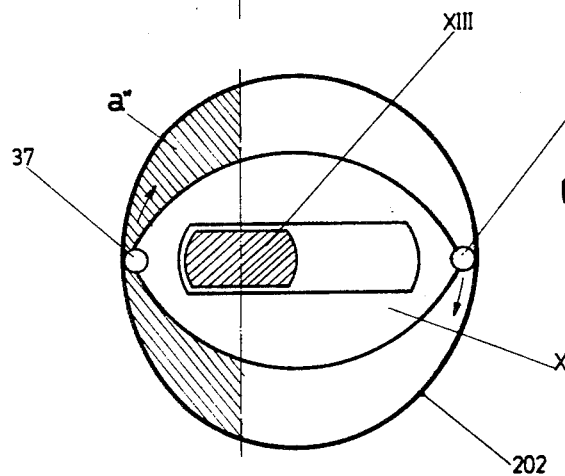
Figure 48C:
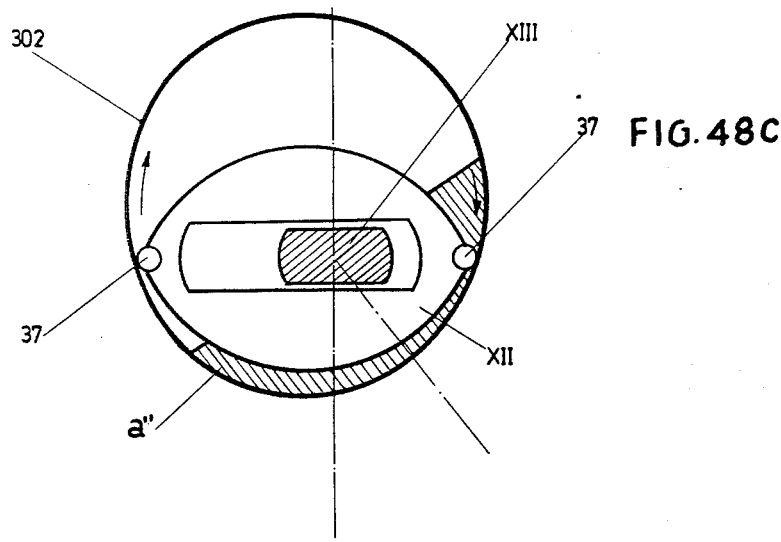
Figure 49:
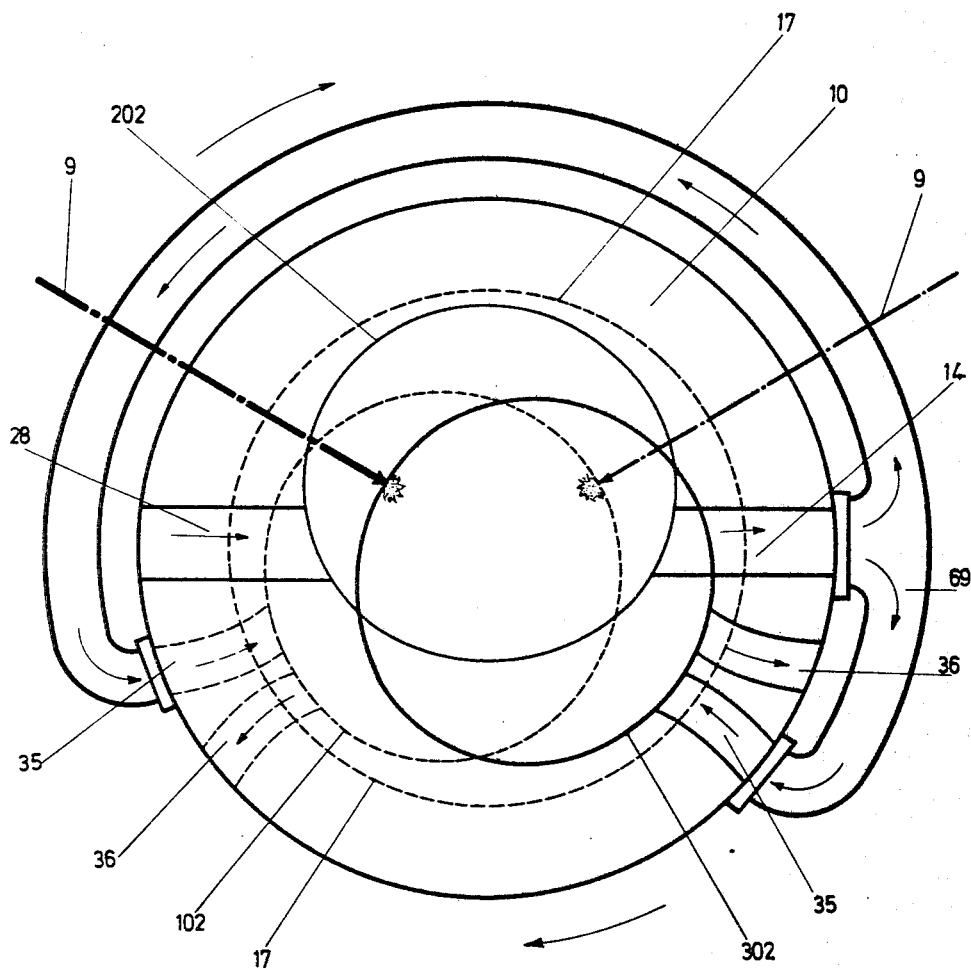

FIGURES 48A, 48B and 48C ad 49 are similar to FIGURES 46 and 47 except that the circular arc forming the chamber extends over less than 180° and the centre of the chord is the engine centre. In FIGURE 49 the central chamber 202 serves as a pump and the other two chambers 102, 302 are working chambers, with inlet ports 28 and exhaust ports 14. The mixture is pumped through the passage 69 and is received via ports 35 in the side chambers 102, 302, the burnt gases being discharged through exhaust ports 36.

FIGURE 50 is a diagrammatic view in cross-section of a chamber whose hatched zone $a'''$ corresponds to the circular part extending over less than 180°, with the engine centre O offset from the centre of the chord, an inlet port 35 and exhaust port 36 and an injection and firing zone 9.

Sealing of the rotors and their chambers comprises two parts—sealing between the plane surfaces of the rotors and the chambers, and sealing between the rotors and the curved surfaces of the chambers. For the former, the plane surfaces of the rotors are formed with grooves parallel to and spaced inwardly from the perimeter of the rotors. These grooves receive flexible elongated sealing means which are urged outwards by springs disposed on the groove bases. Consequently, the sealing means are in continuous engagement with the plane surfaces of the rotor chambers and provide satisfactory sealing. The rollers on the ends of the rotors are sealed by being forced towards the curved surface of the chambers, by the sealing means or springs or both.

Figure 53:
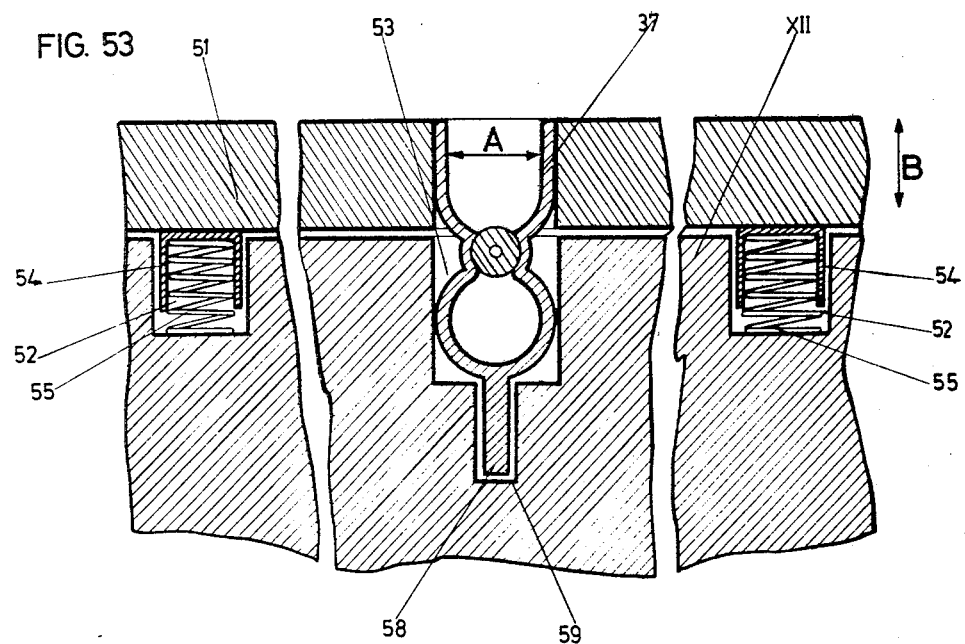
Figure 54:
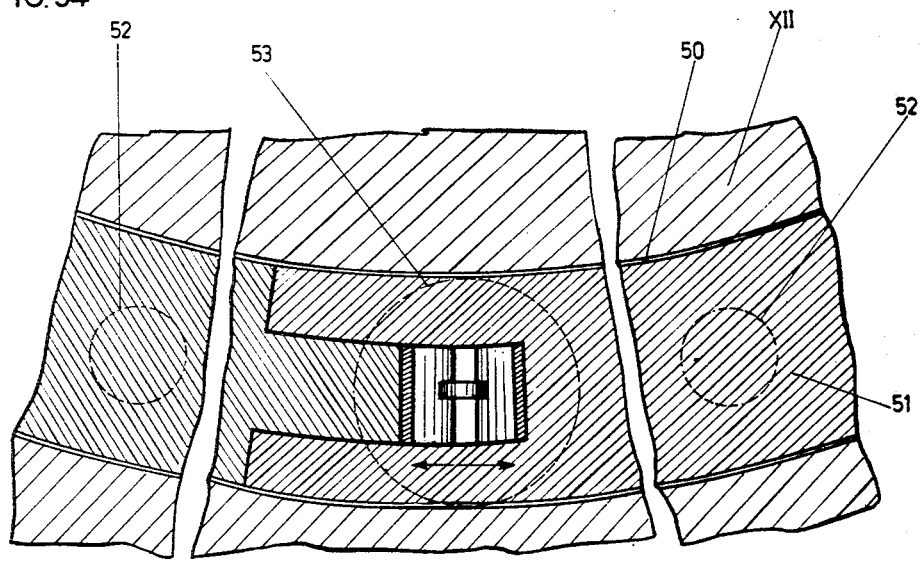

For a better understanding of how sealing can be achieved, a fuller description will now be made with reference to the accompanying drawings wherein:

FIGURE 51 is a view of one of the plane surfaces of a rotor;

FIGURE 52 is a section through the rotor along a longitudinal plane of symmetry;

FIGURE 53 shows in section a detail to an enlarged scale of an arrangement for resiliently urging the sealing means in a rotor into contact with a plane surface of a chamber;

FIGURE 54 is another section of the detail in FIGURE 53;

FIGURE 55 is a perspective view of expanding means for the sealing means;

FIGURE 56 is a perspective view of a spring and head for biasing the sealing means;

FIGURES 57A and 57B show two sections through a roller on a rotor;

FIGURE 58 is a perspective and exploded view of the roller; and

FIGURES 59, 60 and 61 show an arrangement for resiliently urging the roller into contact with the curved surface of a chamber.

As FIGURES 51 and 52 show, the rotor 12 is formed parallel with its periphery with a groove 50 receiving sealing means 51. The base of the groove 50 is formed with recesses 52 receiving springs 55 shown in perspective in FIGURE 56; through the agency of an end cap 54 each spring bears against the sealing means 51. The springs bias the sealing means outwards and compress them against the plane chamber surfaces, to ensure satisfactory sealing.

The sealing means 51 take the form of two parts connected but leaving a small space between two adjacent ends when assembled. The groove 50 has at its centre, as can be seen more clearly in FIGURES 53 and 54, coinciding with the connection of the two parts forming each sealing means, a recess 53 receiving an expander 56 formed, as can be seen in FIGURE 55, with two resilient arms whose ends are introduced into the space between the parts of the sealing means. A cylindrical element 57 is placed between the two arms to increase the expanding force thereof; the arms are interconnected at the bottom and terminate in a cylindrical projection 58 received in a blind hole 59 in the recess 53.

The springs 55 force the sealing means 51 outwards and hence into contact with the plane surfaces of the chambers, and due to the action of the expander 56 the sealing means 51 bias the roller 37 outwards into engagement with the curved surfaces of the chambers, providing sealing in this respect. Sealing is also required at the ends of the roller 37, and so the same is of extensible construction as will be described hereinafter with reference to FIGURES 57 and 58. The roller comprises a central core 60 received in two ferrules 61 interengageable by means of projections on each ferrule which are received in re-entrant portions in the opposite one. Springs 62 are disposed between the end of each ferrule and the core 60 and force the two ferrules towards the plane chamber surfaces. The rollers are so shaped that they can rotate freely while providing satisfactory sealing.

Referring to FIGURES 59, 59B and 60, in co-operation with or without the use of the sealing means 51, a spring 68 is placed in the base of a recess in the end of a rotor and has a ferrule 66 at the top, and a cylindrical element made of an appropriate wear-resistant material is placed between the ferrule 66 and the roller 37; the top surface of the cylindrical element is slightly curved to match the shape of the roller.

The number of recesses 67 receiving the springs can vary. With this system, the rollers are always biased towards the curved surface of the chambers.

What I claim is:

1. In rotary internal combustion engines of the type having a plurality of closed chambers, each of said chambers having spaced parallel side walls and being transversely joined by a continuous arcuate peripheral wall, said chambers being disposed in parallel relationship, a straight rotary shaft extending transversely through all of said chambers, each of said chambers including a rotor supported on said shaft but circumferentially fixed with respect thereto, said rotors having flat side walls for operative engagement with the side walls of a respective chamber and having opposite end marginal portions extending in an axial direction for sliding operative engagement with the arcuate wall of a respective chamber to divide each chambed into two spaces of varying volume responsive to rotation of the shaft, each said chamber having an inlet opening, the arcuate peripheral wall of each chamber comprising a portion defined by a cylinder of revolution extending over an arc of less than 180°, each chamber being disposed to position the mid-point of a chord intersecting the extremities of said arc concentric with the axis of the rotory shaft, another portion of said arcuate wall of each chamber being defined by a line forming one edge of a plane surface lying in the axis of the shaft, the opposite edge of said plane surface being defined by another line parallel with said first line lying in the arc of the cylindrical portion of the arcuate wall and spaced from the first line by a distance equal to the length of said chord, one of the chambers serving as a pumping chamber, the exhaust of said one chamber being interconnected with the inlet of another of said chambers, said pumping chamber serving also to supply said another chamber for transmiting motive power to the shaft and being provided with a bypass passage to ensure that only the exact quantity of mixture required in each cycle is supplied.

2. In rotary internal combustion engines of the type having a plurality of closed chambers, each of said chambers having spaced parallel side walls and being transversely joined by a continuous arcuate peripheral wall, said chambers being disposed in parallel relationship, a straight rotary shaft extending transversely through all of said chambers, each of said chambers including a rotor supported on said shaft for limited translatory movement transversely of the shaft but circumferentially fixed with respect thereto, said rotors having flat side walls for operative engagement with the side walls of a respective chamber and having opposite end marginal portions extending in an axial direction for sliding operative engagement with the arcuate wall of a respective chamber to divide each chamber into two space of varying volume responsive to rotation of the shaft, each said chamber having an inlet opening and an outlet opening spaced from the inlet opening, the arcuate peripheral wall of each chamber comprising a portion defined by a cylinder of revolution extending over an arc of less than 180°, each chamber being disposed to position the midpoint of a chord intersecting the extremities of said arc concentric with the axis of the rotary shaft, another portion of said arcuate wall of each chamber being defined by a line forming one edge of a plane surface lying in the axis of the shaft, the opposite edge of said plane surface being defined by another line parallel with said first line lying on the arc of the cylindrical portion of the arcuate wall and spaced from the first line by a distance equal to the length of said chord, said engine shaft having four surfaces, two equal parallel plane surfaces and two other surfaces which are equal to one another, the plane surfaces being of greater area, the plane surfaces being formed, in the zones where the rotors are disposed, with recesses for anti-friction bearing elements to facilitate the transverse sliding of the rotor on the shaft.

3. In rotary internal combustion engines of the type having a plurality of closed chambers, each of said chambers having spaced parallel side walls and being transversely joined by a continuous arcuate peripheral wall, said chambers being disposed in parallel relationship, a straight rotary shaft extending transversely through all of said chambers, each of said chambers including a rotor supported on said shaft for limited translatory movement transversely of the shaft but circumferentially fixed with respect thereto, said rotors having flat side walls for operative engagement with the side walls of a respective chamber and having opposite end marginal portions extending in axial direction for sliding operative engagement with the arcuate wall of a respective chamber to divide each chamber into two spaces of varying volume responsive to rotation of the shaft, each said chamber having an inlet opening and an outlet opening spaced from the inlet opening, the arcuate peripheral wall of each chamber comprising a portion defined by a cylinder of revolution extending over an arc of less than 180°, each chamber being disposed to position the mid-point of a chord intersecting the extremities of said arc concentric with the axis of the rotary shaft, another portion of said arcuate wall of each chamber being defined by a line forming one edge of a plane surface lying in the axis of the shaft, the opposite edge of said plane surface being defined by another line parallel with said first line lying in the arc of the cylindrical portion of the arcuate wall and spaced from the first line by a distance equal to the length of said chord, each rotor being formed by a body having two plane parallel surfaces perpendicular to the shaft and two curved convex surfaces and the edges where the curved surfaces meet one another follows the curved surface of the chamber sealing between each rotor and the plane side surfaces of its chamber being achieved by elongated sealing means disposed in grooves in the plane surfaces of the rotors near the curved edges and parallel thereto and which open into the recesses receiving the end rollers each sealing means being in two parts with a space therebetween to receive the arms of an expanding element which forces the two plate-like members towards the ends of the rotor to bias the rollers against the curved inside surface of the chamber to provide sealing.

4. In rotary internal combustion engines of the type having a plurality of closed chambers, each of said chambers having spaced parallel side walls and being transversely joined by a continuous arcuate peripheral wall, said chambers being disposed in parallel relationship, a straight rotary shaft extending transversely through all of said chambers, each of said chambers including a rotor supported on said shaft for limited translatory movement transversely of the shaft but circumferentially fixed with respect thereto, said rotors having flat side walls for operative engagement with the side walls of a respective chamber and having opposite end marginal portions extending in an axial direction for sliding operative engagement with the arcuate wall of a respective chamber to divide each chamber into two spaces of varying volume responsive to rotation of the shaft, each said chamber having an inlet opening and an outlet opening spaced from the inlet opening, the arcuate peripheral wall of each chamber comprising a portion defined by a cylinder of revolution extending over an arc of less than 180°, each chamber being disposed to position the mid-point of a chord intersecting the extremities of said arc concentric with the axis of the rotary shaft, another portion of said arcuate wall of each chamber being defined by a line forming one edge of a plane surface lying in the axis of the shaft, the opposite edge of said plane surface being defined by another line parallel with said first line lying in the arc of the cylindrical portion of the arcuate wall and spaced from the first line by a distance equal to the length of said chord, each rotor being formed by a body having two plane parallel surfaces perpendicular to the shaft and two curved convex surfaces, and the adges where the curved surfaces meet one another follows the curved surface of the chamber, said edges being formed with recesses receiving rollers, the rollers at the rotor ends being expanding rollers and comprise two cylindrical ferrules which are interconnected and which receive a cylindrical core, between the ends of which and the bases of the ferrules therebeing two springs which bias the ferrules towards the plane surfaces of the rotor box, for lateral sealing of the rollers.

5. In rotary internal combustion engines of the type having a plurality of closed chambers, each of said chambers having spaced parallel side walls and being transversely joined by a continuous arcuate peripheral wall, said chambers being disposed in parallel relationship, a straight rotary shaft extending transversely through all of said chambers, each of said chambers including a rotor supported on said shaft for limited translatory movement transversely of the shaft but circumferentially fixed with respect thereto, said rotors having flat side walls for operative engagement with the side walls of a respective chamber and having opposite end marginal portions extending in an axial direction for sliding operative engagement with the arcuate wall of a respective chamber to divide each chamber into two spaces of varying volume responsive to rotation of the shaft, each said chamber having an inlet opening and an outlet opening spaced from the inlet opening, the arcuate peripheral wall of each chamber comprising a portion defined by a cylinder of revolution extending over an arc of less than 180°, each chamber being disposed to position the mid-point of a chord intersecting the extremities of said arc concentric with the axis of the rotary shaft, another portion of said arcuate wall of each chamber defined by a line forming one edge of a plane surface lying in the axis of the shaft, the opposite edge of said plane surface being defined by another line parallel with said first line lying in the arc of the cylindrical portion of the arcuate wall and spaced from the first line by a distance equal to the length of said chord, each rotor being formed by a body having two plane parallel surfaces perpendicular to the shaft and two curved convex surfaces, and the edges where the curved surfaces meet one another follows the curved surface of the chamber, said edges being formed with recesses receiving rollers, said recesses at the rotor ends for the rollers also being formed with a number of recesses to receive springs for biasing the rollers outwards against the curved inside surface of the rotor boxes.

6. An engine according to claim 5, wherein a cylindrical member of wear-resistant material is disposed between the rollers and the springs for biasing the same outwards, and the outer surface of the cylindrical member contacting the roller, is curved to match the roller shape.

References Cited

UNITED STATES PATENTS

| | | |
|---|---|---|
| 1,636,486 | 7/1927 | Planche. |
| 1,974,282 | 9/1934 | Kempton. |
| 2,588,342 | 3/1952 | Bidwell. |
| 3,193,187 | 7/1965 | Jones. |
| 3,314,682 | 4/1967 | Peras. |
| 2,359,903 | 10/1944 | Fanning _____ 103—137 |
| 3,298,330 | 1/1967 | Ryusuke _____ 123—8 |

FOREIGN PATENTS 770,389  6/1934  France.

CARLTON R. CROYLE, Primary Examiner

DOUGLAS HART, Assistant Examiner